United States Patent [19]

Kobayashi et al.

[11] Patent Number: 4,784,043
[45] Date of Patent: Nov. 15, 1988

[54] ATOMIZER AND COAL-WATER SLURRY FIRED BOILER UTILIZING THE SAME

[75] Inventors: Hironobu Kobayashi, Katsuta; Shigeru Azuhata, Hitachi; Kiyoshi Narato, Ibaraki; Tooru Inada, Hitachi; Kenichi Sohma, Hitachi; Norio Arashi, Hitachi; Hiroshi Miyadera, Hitachi; Yoshitaka Takahashi, Kure, all of Japan

[73] Assignees: Hitachi, Ltd.; Babcock-Hitachi Kabushiki Kaisha, both of Tokyo, Japan

[21] Appl. No.: 46,574

[22] Filed: May 6, 1987

[30] Foreign Application Priority Data

May 7, 1986 [JP] Japan .................................. 61-103135
Feb. 16, 1987 [JP] Japan .................................. 62-31472

[51] Int. Cl.⁴ ............................................. F23D 1/02
[52] U.S. Cl. ..................................... 110/264; 239/427; 239/434; 431/174; 431/179
[58] Field of Search ............... 239/403, 405, 406, 419, 239/429, 430, 431, 427, 434, 434.5; 110/263, 264; 431/174, 179

[56] References Cited

U.S. PATENT DOCUMENTS

| | | |
|---|---|---|
| 1,661,450 | 3/1928 | Van Sant . |
| 3,650,476 | 3/1972 | Rackley et al. . |
| 4,107,253 | 4/1977 | Wieland et al. . |
| 4,569,295 | 2/1986 | Skoog . |
| 4,601,428 | 7/1986 | Kurogo ............................ 239/434 X |
| 4,604,052 | 8/1986 | Brown et al. ..................... 110/264 X |
| 4,644,878 | 2/1987 | Nodd et al. ...................... 239/406 X |
| 4,644,879 | 2/1987 | Grethe et al. .................... 110/264 X |
| 4,645,129 | 2/1987 | Terrade et al. ....................... 239/427 |
| 4,655,148 | 4/1987 | Winship .......................... 110/264 X |
| 4,679,512 | 7/1987 | Skoog ............................. 110/264 X |

FOREIGN PATENT DOCUMENTS 0117472 9/1984 European Pat. Off. .
3413564 10/1985 Fed. Rep. of Germany .
53-111532 9/1978 Japan .
59-145405 8/1984 Japan .

OTHER PUBLICATIONS

Proceedings of the Sixth International Symposium on Coal Slurry Combustion and Technology, Orlando, Fla., 25th–17th Jun. 1984, pp. 827–844, US Department of Energy et PETC, Pittsburgh, US; N. Chigier. et al: "Atomization of Coal-Water Slurries".

Primary Examiner—Edward G. Favors
Attorney, Agent, or Firm—Fay, Sharpe, Beall, Fagan, Minnich & McKee

[57] ABSTRACT

An atomizer including a fuel supply passage for supplying a fuel, an atomizing medium supply passage for supplying an atomizing medium which is to be mixed with the fuel, a mixing chamber in communication with the fuel supply passage and the atomizing medium supply passage, and spray ports for spraying the fluid mixture consisting of the fuel and the atomizing medium from the mixing chamber. The fuel supply passage and the atomizing medium supply passages are communicated with the mixing chamber through a pre-mixing chamber having an annular cross-section defined by a large-diameter cylindrical surface and a small-diameter cylindrical surface. The fuel and the atomizing medium supplied from the fuel supply passage and the atomizing medium supply passage are pre-mixed the pre-mixing chamber. With this arrangement, it is possible to efficiently mix a slurry fuel and an atomizing medium, thus reducing the particle size of the atomized fuel particles and shortening the flame length. Thus, the atomizer of the invention is indispensable for the boilers which are intended for burning coal-water slurry. The invention makes it possible to form flames with reduced NOx generation and a high burning efficiency through combination between atomizer of the construction described above and a burner having a specific construction.

40 Claims, 11 Drawing Sheets

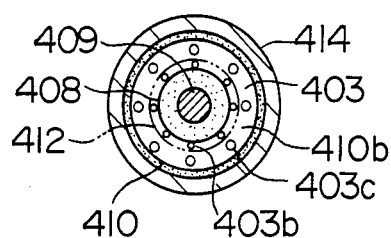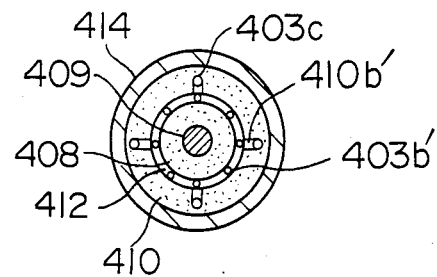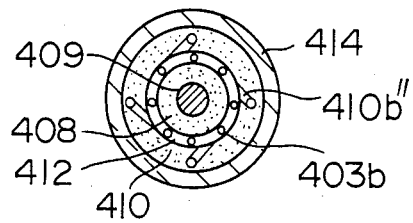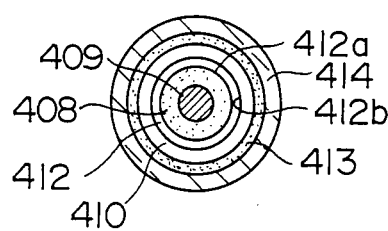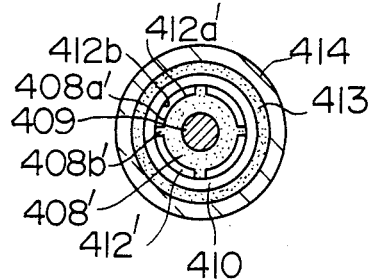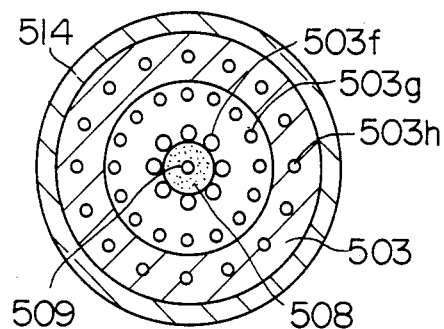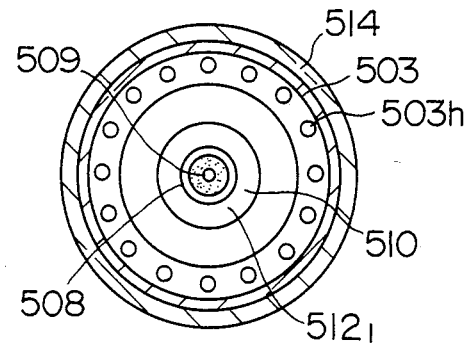

F I G. 12
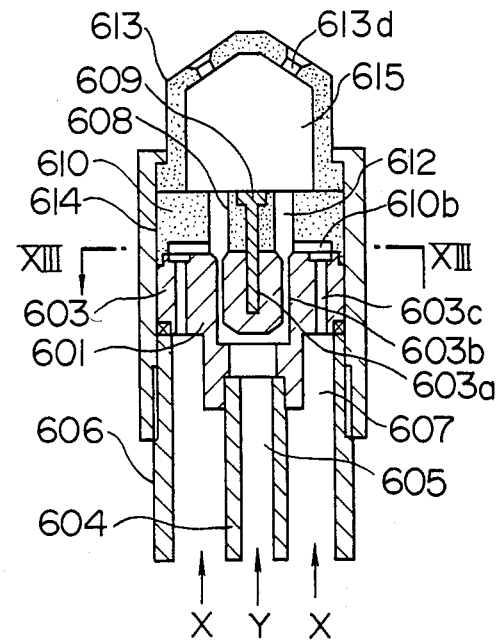
F I G. 13
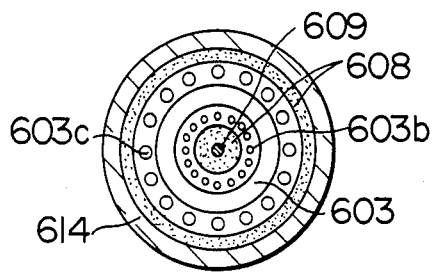
F I G. 14
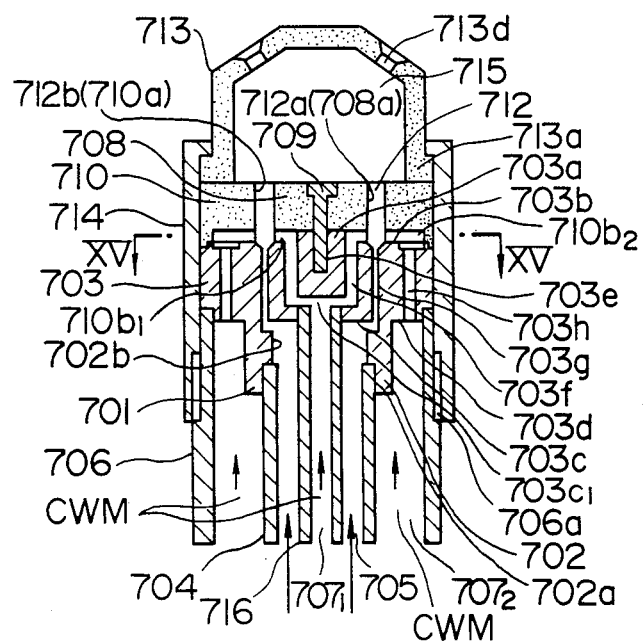

F I G. 15
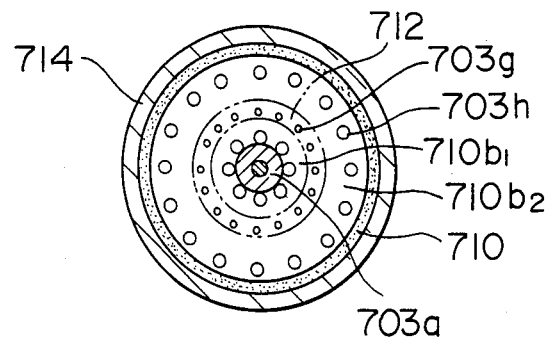
F I G. 16
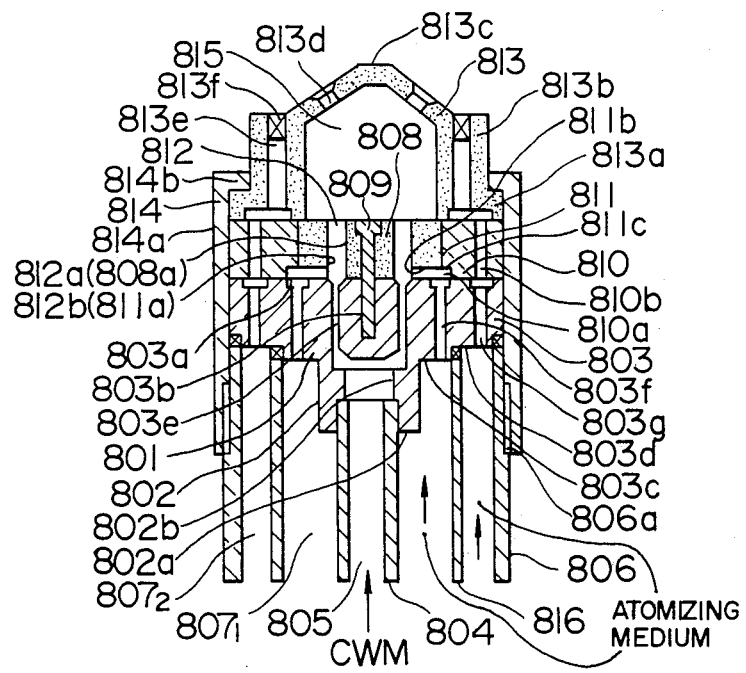

F I G. 18
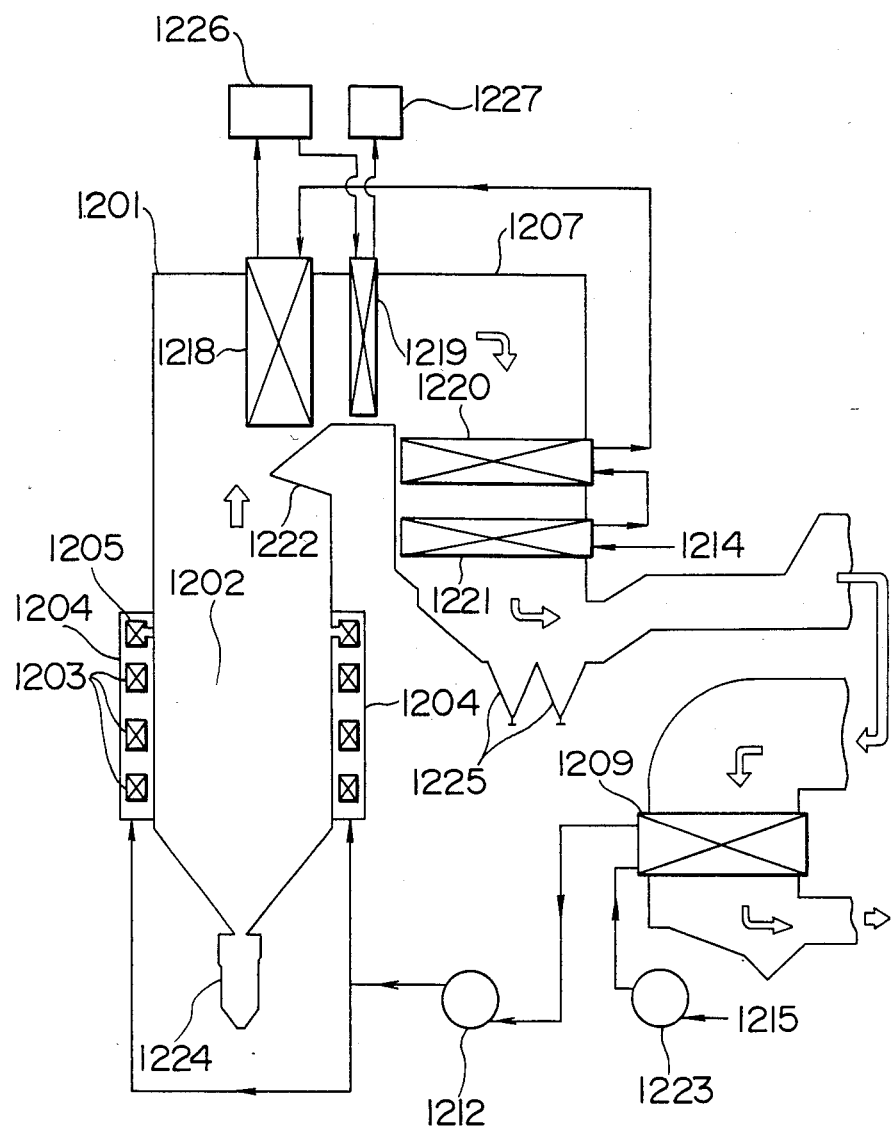

ATOMIZER AND COAL-WATER SLURRY FIRED BOILER UTILIZING THE SAME

BACKGROUND OF THE INVENTION

1. Field of the Invention

This invention relates to a type of atomizer which atomizes liquid fuel by utilizing the kinetic energy of an atomizing medium such as high-pressure air or steam, and more particularly to an atomizer suitable for atomizing coal-water slurry (coal water mixture: hereinafter referred to as "CWM"). This invention also relates to a coal-water slurry fired boiler having an atomizer and a burner suitable for atomizing coal-water slurry by using an atomizing medium such as high-pressure air or steam.

2. Description of the Prior Art

One technique of fluidizing coal is concerned with CWM which is a new way of utilizing coal in place of dust coal and is now increasingly used in boilers for generating electric power or for industrial purposes. Since the use of CWM enables coal to be supplied to a burner by a pump as in the case of a conventional petroleum fuel, it is more favorable in terms of the manner in which fuel is conveyed as compared with air transportation of dust coal; specifically, it facilitates simplification of the flow control system and reduction of the diameter of fuel feed pipes. In examples of the recent usage of CWM, the concentration of coal in the CWM is increased to about 60 to 70 wt % in order to increase the calorific value to a level commensurate with its use as a boiler fuel.

CWM is not so readily burnt as petroleum, and the nitrogen content in CWM fuel is large. For this reason, the burn-off time of atomized particles of CWM is so long that it is difficult to form stable flames. Moreover, when the fuel is burnt, the rate of generation of nitrogen oxides (NOx) caused by the oxidation of the N fraction of the fuel is high. To effect good combustion of CWM fuel, it is necessary to promote heating of atomized particles by promoting the micronization of the fuel so as to reduce the size of atomized particles and hence the surface area thereof relative to the weight, and at the same time to reduce the time which it takes for combustion of the atomized particles.

To reduce NOx, it is necessary to form stable flames by improving the igniting performance, release the N fraction of the CWM before combustion air is fully mixed therewith, form a reducing atomosphere, and mix in the combustion air gradually. The promotion of micronization for good combustion and the promotion of the ignition and stabilization performance for reducing the generation of NOx act upon each other synergistically.

A two-fluid type atomizer which uses high-pressure air or steam for effecting micronization is employed to atomize CWM into fine particles. To micronize a fuel which is inferior in terms of combustibility, it is necessary to reduce the flow rate of the atomizing medium and hence the velocity of atomized particles while reducing the size of the atomized particles. For the purpose of obtaining a good mixture of fuel and atomizing medium, a type of atomizer which has an inner mixing chamber for mixing CWM with an atomizing medium and a plurality of holes provided as spray holes and formed in a wall of the mixing chamber has been disclosed in some known proposals, for example, Japanese Patent Laid-Open No. 36811/1985. In the atomizer disclosed in these known proposals, a chamber for preliminarily mixing fuel with an atomizing medium (hereinafter referred to as "fore mixing chamber") is formed at the upstream side of the mixing chamber. In this arrangement, fuel that has been once changed into fine particles is supplied to the mixing chamber, and mixing of the fuel with the atomizing medium in the mixing chamber is promoted, whereupon it is jetted as atomized particles through spray holes.

The atomizer disclosed in these known proposals is capable of providing fine atomized particles since the atomizing medium can be suitably mixed in the fore mixing chamber under the condition that the mass flow of the atomizing medium relative to that of the fuel is high enough to change the fuel into fine atomized particles.

However, under circumstances that the atomizing medium/liquid mass ratio is small, the momentum of the fuel is greatly increased compared with that of the atomizing medium. For this reason, after the atomizing medium has been jetted properly in the direction that it is supposed to be jetted, it is deflected by the momentum of the fuel toward the downstream side of the pre-mixing chamber, that is, toward the mixing chamber. With respect to the local atomizing medium/liquid mass ratio in the pre-mixing chamber, an atomizing medium/liquid mass ratio higher than that observed when fluids flow in the atomizer is displayed beside the wall of the pre-mixing chamber while an atomizing medium/liquid mass ratio lower than the observed ratio is displayed in the central region of the pre-mixing chamber. Under this condition, the fuel is changed into large particles in the central region of the pre-mixing chamber and into fine particles near the wall thereof. As a result, large particles are supplied to the mixing chamber despite the provision of the pre-mixing chamber and micronizing characteristics are therefore poor.

When the sectional area of the pre-mixing chamber is reduced for the purpose of limiting the generation of large particles, CWM becomes clogged in the mixing chamber, thereby obstructing the action of micronization.

In a suitable form of CWM combustion, fuel is jetted under air-deficient conditions, and mixing of the combustion air with the fuel is positively promoted, thereby improving the ignitability and preventing recession of flames so as to achieve low-NOx combustion. Japanese Patent Laid-Open Nos. 202402/1982 and 19929/1983 disclose examples of a burner in which the mixing of atomized fuel and combustion air is promoted so as to improve the ignitability. In these examples, a fuel pipe is disposed on the axis of the burner, and a plurality of air jet orifices are formed around a fuel jet opening through which the fuel is jetted from the fuel pipe such as to be coplanar with this opening, the fuel pipe and air ejection orifices being provided in a wall of the burner tile which faces the opening formed on the side of the furnace. This type of burner has improved characteristics in terms of ignitability because they are capable of promoting the process of mixing fuel and air and heightening the temperature in the burner tile under the condition that the fuel jet speed is comparatively low, i.e. about 10 to 30 m/s, as in the case of pulverized combustion. However, this burner displays atomized CWM speeds of 100 to 200 and several 10 m/s which are generally five times as high as in the case of pulverized, so that a negative pressure is caused in the vicinity of the outer periphery of the flow of atomized CWM, thereby generating counterflow circulations flowing from the outside of the burner tile to the inside thereof. Since air flows in the form of a plurality of jets along the circumference of the flow of atomized CWM, the pressure distribution in the vicinity of the periphery of the high-speed flow of atomized CWM is not uniform, resulting in unstable and non-uniform counterflow circulations. There is therefore a problem of collision of the flow of atomized CWM against the wall of the burner tile.

CWM contains a great deal of ash. For this reason, when atomized CWM collides with the wall of the burner tile, ash is solidified on the surface of the wall, the pressure distribution in the burner tile becomes less and less uniform, and the possibility of collision of CWM hence increases further, thereby causing ash to adhere to the internal part of the burner tile.

It is therefore important in the combustion of CWM to prevent atomized CWM from sticking to burner walls such as a burner tile as well as to promote the mixing of combustion air.

Japanese Patent Laid-Open No. 145405/1984 discloses a further example of a conventional burner which is provided with a burner tile and in which combustion air is supplied in the form of swirling flows from a wall which faces the opening of the burner tile. However, in this burner, the rate of attenuation of the flow velocity of atomized CWM is reduced such as to cause a problem of recession of the igniting position when combustion air is jetted. This is because combustion air flowing in this type of burner has a velocity component in the axial direction due to the form of construction of the burner and, in general, the higher the relative velocity between a jet and flows flowing along the jet, the larger the rate of attenuation of the jet velocity.

These known arts are based on a policy of independently improving the performance of both the atomizer and the burner. They lack consideration of possible improvements in the combustibility of liquid fuel and reduction of NOx generation from the viewpoint of an overall burner system design including both the burner and the atomizer. In these known arts, not only is combustion air not mixed in a manner proper to the state of atomized particles, but the promotion of micronization for the achievement of good combustion and the promotion of ignition and flame-stabilization are not effected synergistically.

As described above, conventional atomizers generate large-size particles (generally having a diameter of more than 100 μm) because CWM fuel and the atomizing medium are not mixed in a suitable manner. The large-size particles display a small rate of velocity attenuation and are expelled from the furnace after a very short residence time without any involvement in the combustion, resulting in accumulation of the unburnt part.

If a dilatant fluid which increases the rate of generation of large-size particles is provided as a liquid fuel, it is necessary to use a type of atomizer capable of micronizing fuel independently of the flow characteristics.

In the conventional burners having a burner tile for promoting the mixing of atomized CWM with combustion air, air jetted into the burner tile has a velocity component in the direction of the jet of atomized particles, so that the rate of velocity attenuation of atomized particles is obstructed, thereby causing a problem of flames retreating from the burner.

Air which is supplied from the outer periphery of the burner tile is necessarily mixed with atomized fuel in order to prevent the recession of flames. This is one reason for the difficulty in reducing NOx generation.

SUMMARY OF THE INVENTION

1. Object of the Invention

In consideration of the above-described circumstances, it is an object of the present invention to provide an atomizer having a fuel supply channel for supplying a fuel, an atomizing medium supply channel for supplying an atomizing medium to be mixed with the fuel, a mixing chamber communicating with the fuel supply channel and the atomizing medium supply channel, and atomizing orifices for atomizing the fuel and the atomizing medium supplied from the mixing chamber, the atomizer being capable of supplying a fuel such as CWM having solid particles in an atomized state into the mixing chamber.

It is another object of the present invention to provide a coal-water slurry fired boiler capable of jetting fine particles of atomized particles at low speed so as to promote ignition and, further, attenuate the velocity of atomized particles and prevent adherence of ash or the like, as well as reducing NOx generation by injecting combustion air in an optimum manner.

2. Statement of the Invention

To these ends, according to one form of the invention, there is provided an atomizer including a fuel supply passage for supplying a fuel, an atomizing medium supply passage for supplying an atomizing medium which is to be mixed with the fuel, a mixing chamber in communication with the fuel supply passage and the atomizing medium supply passage, and spray ports for spraying from the mixing chamber the fluid mixture consisting of the fuel and the atomizing medium, one of the fuel supply passage and the mixing medium supply passage constituting a mixing-object fluid supply passage while the other constitutes an admixture fluid supply passage, the atomizer comprising:

a pre-mixing chamber having an annular cross-section defined by a large-diameter cylindrical surface and a small-diameter cylindrical surface, the mixing-object fluid supply passage being connected to the mixing chamber through the pre-mixing chamber while the admixture fluid supply passage is connected to admixture fluid supply ports formed in at least one of the large-diameter cylindrical surface and the small-diameter cylindrical surface, the pre-mixing chamber being designed to ensure that the fuel and the atomizing medium are sufficiently mixed with each other before supplied to the mixing chamber.

In a preferred form, the admixture fluid supply ports formed in at least one of the large-diameter cylindrical surface and the small-diameter cylindrical surface are oriented such that the flow of the admixture fluid (either the fuel or the atomizing medium) supplied from the admixture fluid supply ports have a component which is tangential to the cylindrical surface in which the admixture fluid supply ports are formed.

In another preferred form, the admixture fluid supply ports are formed in the bottom of a ring-shaped groove formed in the at least one of the large-diameter cylindrical surface and the small-diameter cylindrical surface.

In still another preferred form, the atomizer is provided with a sprayer plate which constitutes the outer wall of the mixing chamber and having spray ports for spraying the mixture of the fuel and the atomizing medium from the mixing chamber, and another atomizing medium supply passage communicating with a swirler provided in the sprayer plate, the atomizing medium from said swirler being so directed as to be mixed with the mixture of the fuel and the atomizing medium from the mixing chamber.

In the atomizer of the invention having these features, the mixing-object fluid (either one of the fuel and the atomizing medium) flowing from the mixing-object fluid supply passage has the form of a thin liquid film having an annular cross-section (referred to as "annular thin liquid film", hereinafter). On the other hand, the admixture fluid (the other of the fuel and the atomizing medium) supplied through the admixture fluid supply ports intercepts the annular thin liquid film of the mixing-object fluid: namely, has a component perpendicular to the flow of the mixing-object fluid. In consequence, both fluids are effectively mixed with each other both by the force produced by the turbulency of the admixture fluid and the force produced by the momentum of the same, whereby the fuel is atomized into fine particles. In some of the known arrangements, the atomizing medium is jetted in the direction parallel to the flow of the fuel. In such cases, the atomization of the fuel relies mainly on the force produced by the turbulency of the atomizing medium. In contrast, in the atomizer of the present invention, the atomization is promoted by two kinds of force: namely, the force produced by the turbulency and the force produced by the momentum, so that the atomizing effect is less liable to be affected by the fluid characteristics of the fuel. Therefore, the fuel can make a good contact with the atomizing medium even when the fuel does not have Newtonian fluid characteristics, so that any local variation in the gas-liquid flow-rate ratio is avoided in the mixing chamber. This in turn eliminates coarsening of fuel particles which may otherwise be caused when the gas-liquid flow-rate ratio is locally decreased.

In the atomizer of the present invention, the fuel is supplied into the mixing chamber in the form of an atomized state. Since the surface tension of the atomized fuel particle is increased as the particle size is decreased, the atomized fuel particles are sprayed from the spray ports in the mixing chamber, without being coarsened by merging in one another. Part of the fuel, however, may be supplied without being sufficiently atomized, i.e., in the form of comparatively large particles. Such large particles tend to merge in one another to form greater particles. Such particles, however, are fractured into finer particles by a shearing force imparted by the walls of the spray ports when they are sprayed through the spray ports.

The atomization of the fuel in the pre-mixing chamber can be enhanced when the width of the annular passage given by the following formula is selected to be sufficiently small:

width of annular passage =

{(diameter of large-diameter cylindrical surface) −

(diameter of large-diameter cylindrical surface)} × ½

In order to prevent the annular passage from being blocked by CWM, the width of the annular passage should be at least 3/5 of the cylindrical passage.

According to a preferred form, the mixture fluid supply ports formed in one of the cylindrical surfaces are directed such that the admixture fluid jetted therefrom into the pre-mixing chamber has a flow component which is tangential to the cylindrical surface in which these ports are formed, so that the admixture fluid flowing into the pre-mixing chamber forms a swirl. Therefore, the atomized fuel particles formed as a result of contact between the annular thin liquid film of the mixing-object fluid and the admixture fluid can be distributed to the entire region of the mixing chamber by virtue of the swirl.

In another preferred form, the admixture fluid supply ports are constituted by a ring-shaped groove formed in one of the cylindrical surfaces defining the annular pre-mixing chamber. With this arrangement, the admixture fluid can be uniformly supplied because the admixture fluid supply ports are opened over the entire circumference of the cylindrical surface. In consequence, it is possible to obtain a uniform atomizing medium/liquid mass ratio in the pre-mixing chamber.

In still another preferred form of the invention, a swirler is provided on a sprayer plate which defines the mixing chamber. The atomizing medium jetted from this swirler has a flow component which is perpendicular to the direction of flow of the mixture of the fuel and the atomizing medium sprayed from the spray holes. In consequence, the mixture sprayed from the spray ports and the atomizing medium jetted from the swirler merge in each other to form a swirl, and the fuel particles in the sprayed mixture are abruptly decelerated. Therefore, the atomized fuel particles have moderate reach from the outer surface of the sprayer plate, so that the length of the flame can be adjusted to fall within a suitable range.

According to another aspect of the present invention, there is provided a coal-water slurry fired boiler having atomizers for atomizing a coal-water slurry by an atomizing medium, a plurality of burners provided on a wall of a furnace and adapted for mixing the atomized coal-water slurry from the atomizers with a swirl of air so as to burn the coal-water slurry, and steam heating tubes installed in the furnace so as to be heated by the gas generated by burning, wherein the atomizer comprises: a mixing chamber for mixing the coal-water slurry with the atomizing medium and for spraying the mixture through a plurality of spray ports; and a pre-mixing chamber having an annular cross-section and adapted for pre-mixing the coal-water slurry and the atomizing medium before they are mixed in the mixing chamber.

In the atomizer used in the boiler of the invention, the pre-mixing chamber has an elongated cross-section perpendicular to the axis of the atomizer, the longer axis of the elongated cross-section having a length which is large enough to provide a fly distance in the direction of flow of the coal-water slurry sufficient for ensuring mixing of the coal-water slurry and the atomizing medium.

In the atomizer used in the boiler of the present invention, the coal-water slurry as the fuel is sufficiently mixed with the atomizing medium and is sprayed from the spray ports in the form of fine particles of a mean particle size which is not greater than 65 $\mu$m. This in turn enables the distance between the final stage of said burners and the nose for restricting the flow of the burnt gas as compared with known furnaces to a level which is not longer than 2.5 m per 100 MW of the rated output of said boiler.

The atomizer used in the boiler of the invention can have a fuel supply passage for supplying a fuel, an atomizing medium supply passage for supplying an atomizing medium which is to be mixed with the fuel, a mixing chamber in communication with the fuel supply passage and the atomizing medium supply passage, spray ports for spraying the fluid mixture consisting of the fuel and the atomizing medium, and a pre-mixing chamber having an annular cross-section, the fuel supply passage and the atomizing medium supply passage being communicated with the mixing chamber through the pre-mixing chamber, the fuel and the atomizing medium supplied from the fuel supply passage and the atomizing medium supply passage are pre-mixed in the pre-mixing chamber.

In a preferred form, the fuel supply passage or the atomizing medium supply passage includes supply ports provided at the upstream end of the pre-mixing chamber and oriented such that the fuel or the atomizing medium jetted therefrom has a flow component which is tangential to the cylindrical surface in which the supply ports are formed, so that the fuel or the atomizing medium jetted from the supply ports forms a swirl. The thickness of the annular space in the annular pre-mixing chamber is preferably not greater than 4 mm, and the length of the annular space is not smaller than twice as large as the thickness, preferably three to six times as large as the thickness. Most preferably, the thickness of the annular space is 1 to 4 mm. When these conditions are met, it is possible to obtain a finely atomized fuel which is not greater than 65 $\mu$m in terms of mean particles size of the coal-water slurry.

The invention also provides a coal-water slurry fired boiler having atomizers for atomizing a coal-water slurry by an atomizing medium, a plurality of burners provided on a wall of a furnace and adapted for mixing the atomized coal-water slurry from the atomizers with a swirl of air so as to burn the coal-water slurry, and steam heating tubes installed in the furnace so as to be heated by the gas generated by burning, the atomizer including a mixing chamber for mixing the coal-water slurry with the atomizing medium and for spraying the mixture through a plurality of spray ports, and a pre-mixing chamber having an annular cross-section and adapted for pre-mixing the coal-water slurry and the atomizing medium before they are mixed in the mixing chamber, each burner comprising: a primary pre-combustion chamber coaxial with the atomizer and conically diverging from the end of the atomizer; a secondary pre-combustion chamber disposed ahead of the primary pre-combustion chamber; an annular primary air nozzle disposed on the outer periphery of the primary pre-combustion chamber and adapted for introducing into the secondary pre-combustion chamber a primary air in the form of a swirl around the axis of the atomizer; and a secondary air nozzle disposed on the outer periphery of the secondary pre-combustion chamber and adapted for introducing into the furnace a secondary air in the form of a swirl around the axis of the atomizer.

The burner used in the boiler of the present invention can have a primary pre-combustion chamber which is defined by a flame holder provided with a plurality of gaps for introducing a swirl around the axis of the atomizer.

In the burner used in the boiler of the present invention, it is preferred that the diverging angle of the primary pre-combustion chamber is greater than the angle of spray of the coal-water slurry and that the rate of supply of the primary air is smaller than that required for perfect burning of the coal while the rate of supply of the secondary air is sufficient for the perfect burning of the coal.

The flame holder provided on the burner preferably has a plurality of blades extending in the direction of spray of the fuel, each blade having a trapezoidal form with a tapered side surface, the blades being disposed at a predetermined interval such that the space between the adjacent blades constitutes a passage for introducing seal air into the primary combustion chamber.

In another form, the flame holder is constituted by a plurality of frusto-conical rings having different diameters, the frusto-conical rings being disposed such that the large-diameter end of a smaller frusto-conical ring is disposed inside the smaller-diameter end of an adjacent larger frusto-conical ring leaving a predetermined gap therebetween. A sleeve pipe connected to the flame holder has a swirler for causing a seal air to swirl. The flame holder has a sectional shape such that its side is concaved or convexed from the line which connects the spray port of the atomizer and the downstream end of the flame holder.

An explanation will be given hereinunder as to the operation of the burner used in the boiler of the present invention.

Hitherto, it has been a conventional measure to supply a primary air into the primary combustion chamber at a rate amounting to 20 to 30% of the stoichiometric rate. This measure, however, is not appropriate for attaining a stable flame with CWM as the fuel. In the burner used in the boiler of the present invention, the ignition and low-air-ratio combustion are achieved by secondary air. Hitherto, it has been a common practice to supply the secondary air into the furnace at a flare angle of 30° to 60°, so that it does not effectively mix with the fuel. According to the invention, in order to prevent the secondary air from being spread to the peripheral region of the burner, a secondary combustion chamber is formed so as to have a horizontal inner surface. The secondary air, i.e., the air which has been left without being supplied to the primary combustion chamber is mixed with the fuel in this secondary combustion chamber so as to promote the burning of the fuel. Thus, in the burner used in the boiler of the present invention, the secondary combustion chamber is provided for the purpose of promoting the mixing of the secondary air and the fuel.

In the conventional boilers, a stationary swirler is used for the purpose of supplying the secondary air in the form of a swirl. In general, CWM can contain a variety of classes of coal, including a coal rich in volatile component and a coal which is not so rich in volatile component, resulting in a wide variation in the ignitability. According to the invention, therefore, the strength of the swirl of the secondary air is controllable, i.e., adjustable. The jetting of the secondary air in the form of a swirl creates a negative pressure in the core region of the swirl so as to form a recirculating flow in the core region. This generally improves the flame holding performance. However, since the optimum supply rate of the coal varies depending on the class of the coal, it is necessary to suitably control the momentum of the swirl. A too strong swirl tends to cause the flame to spread outward, resulting in an unstable burning. According to the invention, however, the secondary chamber effectively suppresses the spreading of the flame, thus contributing to the formation of the recirculating flow.

It is also a common measure to supply ternary air from a plurality of ternary nozzles, in order to cool the flame thereby suppressing production of NOx. The cooling of the flame is effective for oil fuels because the production of thermal NOx can be appreciably suppressed by such cooling. However, in the case of coal fuel, the cooling of the flame does not appreciably suppresses the generation of NOx because in this case most of NOx is the fuel NOx rather than thermal NOx. Thus, in the present invention, the ternary air is supplied for the purpose of ensuring perfect burning of the fuel. Normally, the rate of supply of the secondary air is from 40 to 60% of the stoichiometric air necessary for the perfect burning, and the balance of the air is added as the ternary air. In the burner used in the boiler of the invention, the ternary air is supplied through an annular nozzle, and a swirler is provided for the purpose of control of the strength of the swirl of the ternary air so as to allow a control of the mixing between the low-air-ratio flame and the ternary air.

BRIEF DESCRIPTION OF THE DRAWINGS

FIG. 7A is a sectional view taken along the line VII—VII of FIG. 6;

FIGS. 7B and 7C are sectional views taken along the line VII—VII of FIG. 6, showing modifications of the fifth embodiment;

FIG. 8A is a sectional view taken along the line VIII—VIII of FIG. 6;

FIG. 8B is a sectional view taken along the line VIII—VIII of FIG. 6, showing a modification of the fifth embodiment;

FIG. 10 is a sectional view taken along the line X—X of FIG. 9;

FIG. 11 is a sectional view taken along the line XI—XI of FIG. 9;

FIG. 12 is a sectional view of a seventh embodiment of the atomizer in accordance with the present invention;

FIG. 13 is a sectional view taken along the line XIII—XIII of FIG. 12;

FIG. 14 is a sectional view of an eighth embodiment of the atomizer in accordance with the present invention;

FIG. 15 is a sectional view taken along the line XV—XV of FIG. 14;

FIG. 16 is a sectional view of a ninth embodiment of the atomizer in accordance with the present invention;

FIG. 18 is another CWM boiler;

DESCRIPTION OF THE PREFERRED EMBODIMENTS

Figure 1:
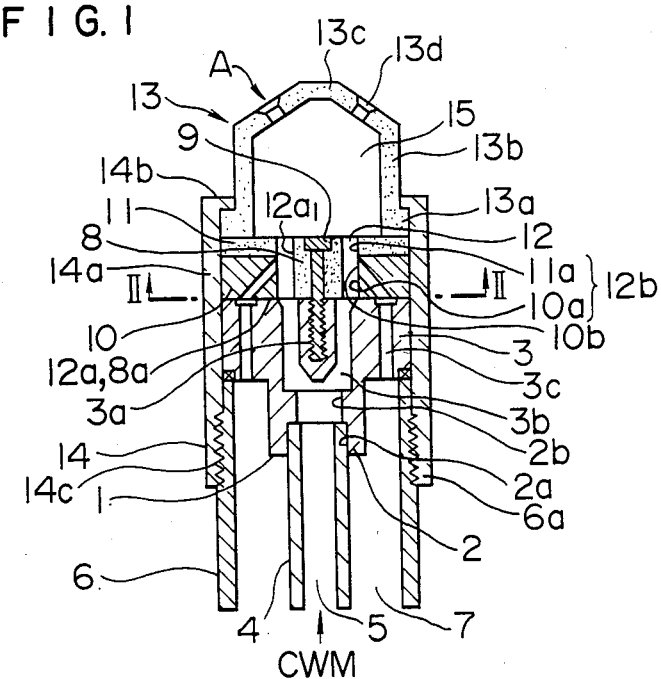
FIG. 1 is a sectional view of a first embodiment of the atomizer in accordance with the present invention.

First to ninth embodiments of the atomizer will be described hereinunder with reference to FIGS. 1 to 16. Throughout these Figures, the same reference numerals with addition of 100(n−1), where n represents the numbers of the order of the respective embodiments, are used to denote the same parts or members, and duplication of explanation of such parts or members is omitted.

First Embodiment

Figure 2:
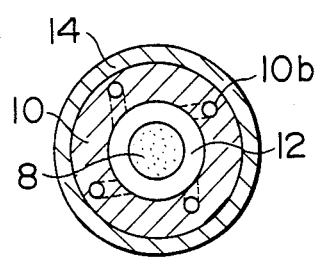
FIG. 2 is a sectional view taken along the line II—II of FIG. 1.

FIG. 1 is a sectional view of the first embodiment of the atomizer in accordance with the present invention, while FIG. 2 is a sectional view taken along the line II—II of FIG. 1. The atomizer has an atomizer head 1 having a cylindrical portion 2 and a disk portion 3 provided on the downstream end (upper end as viewed in FIG. 1) of the cylindrical portion 2. The disk portion 3 has a diameter greater than that of the cylindrical portion 2. The cylindrical portion 2 has a stepped bore. The downstream end portion (upper end portion as viewed in FIG. 1) of the bore has a greater diameter as at 2a, while the upstream end portion of the bore has a smaller diameter as at 2b. The disk portion 3 is provided at its central portion with a female thread portion 3a which opens to the downstream side. A plurality of cylindrical passages, e.g., 12 passages, denotes by 3b are formed around the female thread portion 3a. These passages are for a mixing-object fluid which is, in the first embodiment, the CWM. These CWM passages 3b communicate at their upstream ends with the small-diameter bore 2b in the cylindrical member 2. The downstream ends of these passages 3b are opened in the downstream end of the disk portion 3. The disk portion 3 further has four equispaced passages 3c arranged concentrically with the female thread portion 3a and arranged on the radially outer side of the CWM passages 3b. The passages 3c are for an admixture fluid which is, in this embodiment, an atomizing medium such as steam, oxygen or the like. The atomizing medium passages 3c extend through the disk portion 3 from the upstream end to the downstream end of the same.

An inner tube 4 is received at its downstream end by the small-diameter bore 2a of the cylindrical portion. Thus, a mixing-object fluid passage 5 formed in the inner tube 4 is communicated with the plurality of cylindrical CWM passages 3b through the internal bore of the cylindrical member 2. In this embodiment, therefore, the mixing-object fluid passage 5 serve as a CWM passage for supplying the CWM which is the fuel.

An outer tube 6 is disposed around the inner tube 4. The downstream end of the outer tube 6 abuts the outer peripheral region of the upstream end of the disk portion 3. The outer tube 6 has a downstream end portion having an outside diameter which is the same with that of the disk portion 3. The portion of the outer tube 6 upstream of the above-mentioned downstream end portion is provided with a male thread 6a. An annular passage 7 for the admixture fluid is defined by the inner peripheral surface of the outer tube 6 and the outer peripheral surface of the inner tube 4. In the first embodiment, this annular passage 7 is used as the atomizing fluid supply passage 7 for supplying the atomizing fluid and, hence, communicates with the atomizing (second) fluid passages 3c. A columnar nozzle tip 8, made of a wear-resistant material such as ceramics, is connected to the central portion of the downstream end of the disk portion 3, by means of a nozzle-tip retainer having a threaded end screwed to the female thread 3a in the disk portion 3. A cylindrical nozzle block 10 is disposed on the downstream end of the disk portion 3. The nozzle block 10 has an outside diameter which is the same as that of the disk portion 3. Four passage holes 10b for the admixture fluid are formed between the inner peripheral surface 10a of the nozzle block 10 and the upstream end (lower end as viewed in FIG. 1) of the same. The admixture fluid passage holes 10b are used in this embodiment as the atomizing medium supply holes 10b for supplying the atomizing medium. A ring-shaped nozzle tip 11, made of a wear-resistant material such as ceramics, is disposed on the downstream end (upper end as viewed in FIG. 1) of the nozzle block 10. The ring-shaped nozzle tip 11 has an outside diameter which is the same as that of the disk portion 3. The inner peripheral surface 11a of the ring-shaped nozzle tip 11 and the inner peripheral surface 10a of the nozzle block 10 are flush with each other and, hence, form a continuous cylindrical inner surface which cooperate with the outer peripheral surface 8a of the nozzle tip 8 in defining therebetween an annular space constituting a pre-mixing chamber. Thus, the pre-mixing chamber 12 is defined by a small-diameter cylindrical surface 12a presented by the outer peripheral surface of the columnar nozzle tip 8 and a large-diameter cylindrical surface 12b presented by the inner peripheral surfaces 10a and 11a which are flush with each other.

The pre-mixing chamber 12 is communicated with the CWM supply passage 5 through the CWM passages 3b. The atomizing medium supply ports 10b are so designed that, when the atomizing medium is jetted into the CWM which is flowing from the upstream end (lower end as chamber, the jetted atomizing medium has a component which coincides with the direction of flow of the CWM and a component perpendicular to the direction of flow of the CWM, as well as a component which is tangential to the large-diameter cylindrical surface 12b, as will be seen from FIGS. 1 and 2. In addition, the atomizing fluid supply ports 10b are aimed at the downstream end 12a₁ of the small-diameter cylindrical surface 12a.

A sprayer plate 13 is provided on the downstream end surface of the ring-shaped nozzle tip 11. The sprayer plate 13 has an upstream end flange portion 13a, an intermediate cylindrical portion 13b and a substantially conical crown portion 13c. The flange portion 13a has an outside diameter which is the same as that of the disk portion 3. A plurality of, e.g., four, atomizing ports 13d are arranged in the radial directions so as to allow the jets therefrom to diverge. The inner wall surface of the sprayer plate 13 tends to be worn by the atomized particles of the CWM introduced at a high velocity. Therefore, the sprayer plate 13 is made of a material such as ceramics, in order to prevent wear of the inner surface thereof. Examples of such ceramics are sintered products of SiC, $Al_2O_3$, $Si_3{}_3N_4$, $Si_3N_4$-$Al_2O_3$ and so forth. Preferably, the outer peripheral surface of the sprayer plate 13 is covered and protected by a metal such as stainless steel.

As stated before, the flange portion 13a of the sprayer plate 13, ring-shaped nozzle tip 11, nozzle block 10, disk portion 3 and the downstream end of the outer tube 6 have an equal diameter which corresponds to the inside diameter of a cap nut 14. The cap nut 14 has a cylindrical wall 14a, and an end wall 14b having a through hole penetrated by the cylindrical wall 13b of the sprayer plate 13. The cap nut 14 is provided with an internal screw thread formed in the inner peripheral surface of the downstream end of the cylindrical wall 14a thereof and adapted for screwing engagement with the external screw thread 6a on the outer tube 6. As the cylindrical wall 14a of the cap nut 14 is screwed onto the outer tube 6, the end wall 14a of the cap nut presses the flange portion 13a of the sprayer plate 13, whereby the sprayer plate 13, ring-shaped nozzle tip 11, nozzle block 10 and the atomizer head 1 are rigidly fixed onto the outer tube 6.

The sprayer plate 13, ring-shaped nozzle tip 11 and the columnar nozzle tip 8 in combination define a mixing chamber 15. The mixing chamber 15 is communicated with the pre-mixing chamber 12 and has a cross-sectional area greater than that of the pre-mixing chamber 12. The mean length of the mixing chamber 15, determined by dividing the volume of the mixing chamber 15 by the diameter, ranges between 0.3 and 0.7 of the above-mentioned diameter.

In the first embodiment of the atomizer of the invention having the described construction, the CWM is supplied to the pre-mixing chamber 12 having an annular cross-section from the CWM supply passage 5 through the CWM passages 3b. The CWM flowing through the pre-mixing chamber 12 of annular cross-section exhibits the form of a liquid film having an annular cross-section, i.e., a liquid film having a small thickness. In addition, the atomizing fluid jetted from the atomizing medium supply ports 10b at high velocity is directed to intercept the liquid film of the CWM, i.e., has a component which is perpendicular to the direction of flow of the CWM. It is, therefore, possible to effectively fraction the liquid film of CWM by the turbulent energy and momentum of the turbulent flow of the atomizing fluid having high velocity. Thus, the atomization of the liquid film of CWM through the interception by the atomizing fluid is effected by actions of two types of force: namely, the force produced by the turbulency of the atomizing fluid and the force produced by the momentum of the same. The atomizing effect, therefore, is not so much changed by the fluid characteristics of the CWM. Namely, the CWM in the form of the liquid film can be uniformly and stably contacted by the atomizing medium, so that any local variation in the atomizing medium/liquid mass ratio is eliminated in the pre-mixing chamber 12. It is, therefore, possible to prevent any tendency of coarsening of the atomized fuel particles which may be caused when the atomizing medium/liquid mass ratio is decreased.

As explained before, the atomizing medium ports 10b are aimed at the downstream end 12a₁ of the small-diameter cylindrical surface 12a of the pre-mixing chamber 12, so that the atomizing medium jetted from the ports 10b are caused to impinge upon the wall surface 12a₁. This flow of the atomizing medium is accompanied by the flow of the CWM particles which were formed as the liquid film of the CWM is intercepted by the atomizing medium so that the particles of CWM also are caused to collide with the wall surface $12a_1$ so as to be atomized or micronized again. Thus, the mixture of the atomizing medium and the particles of CWM, directed towards the wall surface $12a_1$, strongly collides with the wall surface $12a_1$ so that the atomization of the CWM is further enhanced to micronize the CWM, and the thus micronized CWM particles are then introduced into the mixing chamber.

As stated before, the atomizing fluid supply ports $10b$ are so oriented that the jets of the atomizing medium from these ports have a component which is tangential to the large-diameter cylindrical surface $12b$ of the pre-mixing chamber 12. Therefore, the jets of the atomizing medium coming from the atomizing medium supply ports $10b$ into the pre-mixing chamber 12 form a swirl. In consequence, the atomized particles of the CWM formed as a result of contact between the liquid film of the CWM and the atomizing medium can collide with the wall surface $12a_1$ uniformly over the entire area of the wall surface $12a_1$ and the micronized particles of the CWM are uniformly distributed into the mixing chamber 15 by the action of the swirl.

Thus, the micronized particles of the CWM are supplied into the mixing chamber 15 in the form of a swirl. The energy of the swirl is still maintained also in the mixing chamber 15, so that the micronized particles of the CWM in the mixing chamber 15 are well dispersed. Since the surface tension of the micronized particles is increased as the particle size gets smaller, the micronized particles of the CWM do not exhibit any tendency to merge in one another, thus eliminating any tendency of coarsening of the particles in the mixing chamber 15.

A small part of the atomized particles of the CWM may not be micronized in the pre-mixing chamber 12 and supplied into the mixing chamber in the form of rather coarse atomized particles. Such particles may join one another to form large particles of the CWM. Such large particles, however, are fractured into smaller particles due to a shearing force exerted by the walls of the nozzle ports $13d$ when such large particles are sprayed from the nozzle ports $13d$.

As will be understood from the foregoing description, in the first embodiment of the atomizer in accordance with the present invention, the mixture supplied to the mixing chamber 15 is not a mere mixture of the CWM and the atomizing medium but is the mixture of the micronized particles of the CWM and the atomizing medium which has been formed in the pre-mixing chamber 12. In consequence, the mixing of the CWM and the atomizing medium in the mixing chamber 15 is conducted in a very efficient manner thus attaining a remarkable reduction in the mean particle size of the fuel particles. The pre-mixing of the CWM and the atomizing medium in the pre-mixing chamber 12 can be effected in a very good manner even when the rate of supply of the CWM is decreased without changing the atomizing medium/liquid mass ratio. This makes it possible to increase the value of turn-down ratio which is the ratio between the maximum CWM supply rate and the minimum CWM supply rate which enable the mean particle size to be maintained below a predetermined value under a given atomizing medium/liquid mass ratio. This in turn enables the furnace to cope with a demand for a wide variation of the burning rate or load.

Second Embodiment

Figure 3:
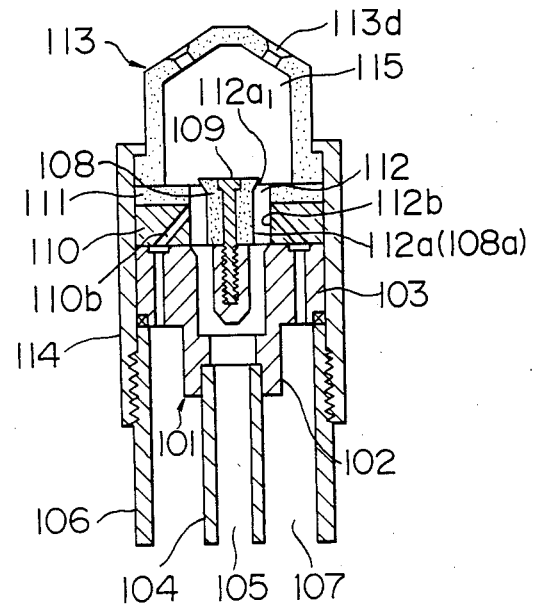
FIG. 3 is a sectional view of a second embodiment of the atomizer in accordance with the present

A second embodiment of the atomizer in accordance with the present invention will be described hereinunder with reference to FIG. 3.

The second embodiment is different from the first embodiment in that the columnar nozzle tip 8 in the latter is substituted by a columnar nozzle tip 108 which is flared or diverged towards the downstream end in a conical form. Thus, the outer peripheral surface $108a$ of the columnar nozzle tip 108 is conically diverged at its downstream end portion. As in the case of the first embodiment, the outer peripheral surface $108a$ of the columnar nozzle tip 108 provides the small-diameter cylindrical surface of the annular mixing chamber 112, so that the downstream end wall surface $12a_1$ is constituted by the conical surface of the downstream end of the outer peripheral surface $108a$. The pre-mixing chamber 112 of the second embodiment, therefore, has a form which is the same as that of the pre-mixing chamber 12 of the first embodiment, except for the shape of the outer peripheral surface $108a$ of the columnar nozzle tip 108. It is to be noted also that the diverging end of the conical end portion of the columnar nozzle tip 108 slightly projects into the mixing chamber 115. Other portions of the atomizer in accordance with the second embodiment are materially the same as those of the first embodiment.

In this second embodiment, the geometrical size of the diverging conical downstream end portion of the columnar nozzle tip 108 can be determined such as to maximize the flow velocity of the atomizing medium at the downstream end of this nozzle tip 108. With such a design, it is possible to effectively micronize the atomized CWM particles by making an efficient use of the force of turbulence of the atomizing medium, force produced as a result of vibratory expansion and contraction of the atomized medium in the vicinity of the surface of the columnar nozzle tip 108, and the force produced as a result of collision of the atomizing medium. The wall surface $112a_1$, i.e., the conical outer peripheral surface of the downstream end of the columnar nozzle tip 108, imparts to the flow of the micronized CWM particles velocity components which tend to spread radially outwardly the micronized CWM particles flowing into the mixing chamber 115. In consequence, desirable circulating flow of the micronized particles and atomizing medium is formed in the mixing chamber 115, thereby remarkably reducing the particle size of the fuel particles jetted from the spray ports $113d$.

Third Embodiment

Figure 4:
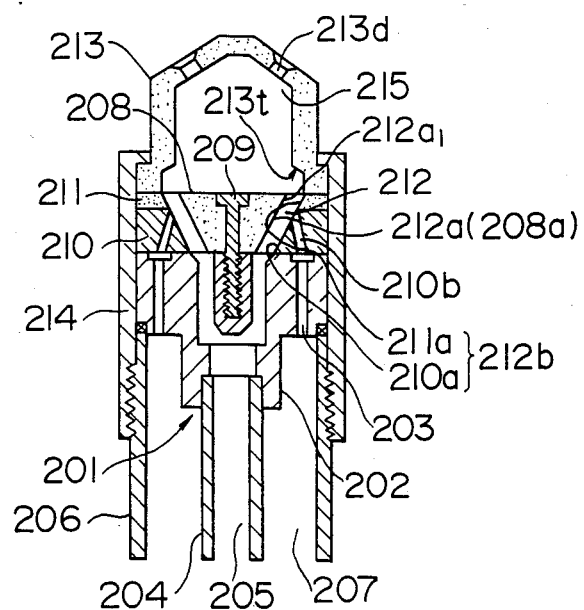
FIG. 4 is a sectional view of a third embodiment of the atomizer in accordance with the present invention.

FIG. 4 shows a third embodiment of the atomizer of the invention in which a conical nozzle tip 208 is used in place of the columnar nozzle tip 8 of the first embodiment. The conical nozzle tip 208 has a frustoconical form the outside diameter of which gradually increases towards the downstream end. Thus, the outer peripheral surface of the nozzle tip 208 is a diverging conical surface. The atomizer of this embodiment also is distinguished from the first embodiment in that a nozzle block 210, a ring-shaped nozzle tip 211 and a sprayer plate 213 are used in place of the nozzle block 10, ring-shaped nozzle tip 11 and the sprayer plate 13 of the first embodiment. The nozzle block 210 also has a conical inner peripheral surface $210a$ which diverges towards the downstream end. Similarly, the nozzle tip 211 has a conical inner peripheral surface 211a which diverges towards the downstream end. The conical inner surfaces 21a and 211a form a continuous conical surface which cooperates with the outer peripheral surface 208a of the conical nozzle tip 208 in defining therebetween an annular space, i.e., the pre-mixing chamber 212. Thus, in this embodiment, the pre-mixing chamber 212 is defined by the small-diameter cylindrical surface 212a presented by the outer peripheral surface 208a of the conical nozzle tip 208 and the large-diameter cylindrical surface 212b constituted by the inner peripheral surfaces 210a and 221a which are flush with each other. The downstream end portion of the outer peripheral surface 208a constitute the wall surface 212a₁ of smaller diameter of the mixing chamber 212 which is aimed at by the atomizing medium supply ports 210b formed in the nozzle block 210. The sprayer plate 213 and the downstream end surface of the conical nozzle tip 208 in combination form a mixing chamber 215. An annular target 213t serving as a collision wall is provided on the inner surface of the sprayer plate 213. The target 213t is located at a position where the flow of the mixture of the atomized CWM particles and the atomizing medium coming from the pre-mixing chamber into the mixing chamber 215 collides with the inner surface of the sprayer plate 213. Other portions of the atomizer of the third embodiment are materially the same as those of the first embodiment.

In operation, the CWM is atomized in the pre-mixing chamber 212 by the same action as the first embodiment. The mixture of the atomized CWM particles and the atomizing medium flows into the mixing chamber 215 and collides with the target 213t, so that the atomized CWM particles are further micronized.

Fourth Embodiment

Figure 5:
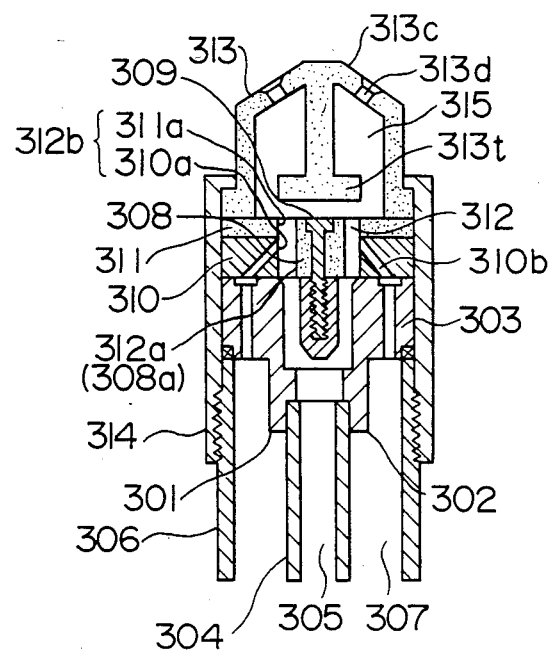
FIG. 5 is a sectional view of a fourth embodiment of the atomizer in accordance with the present

FIG. 5 shows a fourth embodiment which is different from the first embodiment in that a sprayer plate 313 is used in place of the sprayer plate 13 of the first embodiment. The sprayer plate 313 is distinguished from the sprayer plate 13 by a disk-shaped target 313t serving as a collision wall. The target 313t is integrally formed on upstream end of a rod-like member that projects from the center of the crown 313c of the sprayer plate 313 towards the upstream side. Since the configuration of the sprayer plate 313 is different from that of the sprayer plate 13, the form of the mixing chamber 315 is correspondingly different from the form of the mixing chamber 15 of the first embodiment. Other portions are materially the same as those of the first embodiment. Thus, the pre-mixing chamber 312 in this embodiment has the same construction as the pre-mixing chamber 12 of the first embodiment. The target 313t on the sprayer plate 313 is disposed at a position slightly spaced from the downstream end surface of the pre-mixing chamber 312 so as to oppose the latter.

In operation, the CWM is atomized in the pre-mixing chamber 312 by the same action as the first embodiment. The mixture of the atomized CWM particles and the atomizing medium flows into the mixing chamber 315 and collides with the disk-shaped target 313t, so that the atomized CWM particles are further micronized. The particles of the CWM fuel upon collision with the target 313t are spread in the radial direction of the mixing chamber 315. In consequence, no CWM particles move directly from the pre-mixing chamber 312 to the spray ports 313d of the sprayer plate 313. Thus, the atomized CWM particles and the atomizing medium are uniformly distributed to a plurality of spray ports 313d, thus eliminating any local variation of the fuel spray which may otherwise be caused by a non-uniform distribution of the atomized fuel particles to the spray ports 313d. This in turn ensures a uniform distribution of the sprayed fuel particles around the axis of the burner, thus eliminating any local variation in the air-fuel ratio in the low-air-ratio region around the burner. It is, therefore, possible to form the low-air-ratio region in the vicinity of the burner without fail, thereby allowing the NOx content to be reduced.

Fifth Embodiment

Figure 6:
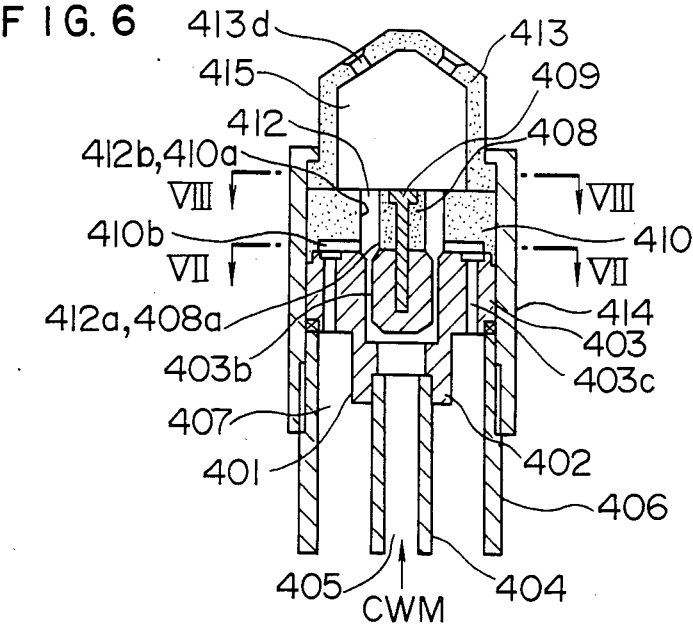
FIG. 6 is a sectional view of a fifth embodiment of the atomizer in accordance with the present invention.

FIGS. 6, 7A and 8A show a fifth embodiment of the atomizer in accordance with the invention and its variations. FIGS. 7B and 7C show modifications of the embodiment shown in FIG. 7A, while FIG. 8B shows a modification of the embodiment shown in FIG. 8A.

Referring to FIGS. 6, 7 and 8, the fifth embodiment of the atomizer in accordance with the present invention is discriminated from the first embodiment in that a ring-shaped nozzle tip 410 of a large thickness and made of a wear resistant ceramics material is used in place of the nozzle block 10 and the ring-shaped nozzle tip 11 of the first invention and in that the plurality of CWM passages 3b formed in the cylindrical portion 3 of the atomizer head 1 are substituted by a plurality of CWM passages 403b formed in the cylindrical portion 403 of the atomizer head 401. The CWM passage 403b is different from the CWM passage 3b in that its downstream end portion diverges to increase its diameter towards the downstream end. In this fifth embodiment, the pre-mixing chamber 412 is defined by the inner peripheral surface 410a of the ring-shaped nozzle tip 410 and the outer peripheral surface 408a of the columnar nozzle tip 408. In this embodiment, therefore, the small-diameter cylindrical surface 412a and the large-diameter cylindrical surface 412b are respectively constituted by the outer peripheral surface 408a of the columnar nozzle tip 408 and the inner peripheral surface 410a of the ring-shaped nozzle tip 410. The upstream end surface of the ring-shaped nozzle tip 410 is provided with an annular groove which forms an admixture fluid supply port 410b in cooperation with the downstream end surface of the cylindrical portion 403 of the atomizer head 401. As in the case of the first embodiment, the annular groove is used as the atomizing medium supply port 410b for supplying the atomizing fluid. A plurality of, e.g., 8, atomizing medium passages 403c formed in the disk portion 403 open in the outer peripheral portion of the ring-shaped atomizing medium supply port 410b. Other portions of this atomizer are materially the same as those of the first embodiment.

In operation of this embodiment, the atomizing medium supplied from the atomizing fluid supply passage 407 flow through the plurality of atomizing medium supply passages 403c and then flows into the common ring-shaped atomizing medium supply port 403b. In this port, the flow of the atomizing fluid is deflected such as to have a flow component which is perpendicular to the flow of the CWM in the pre-mixing chamber 412, and is then jetted into the pre-mixing chamber 412. In this fifth embodiment, the atomizing medium can be supplied uniformly over the entire circumference of the pre-mixinq chamber because a single atomizing medium supply passage 410b in the form of a ring is used, whereby the gas-liquid flow-rate ratio is uniformalized in the whole region of the pre-mixing chamber.

FIG. 7B shows a first modification of the atomizer shown in FIG. 7A having a different form of the atomizing medium supply port 410b. In this first modification, the atomizing medium supply port includes four atomizing medium supply ports 410b' which are extended in the radial direction of the annular pre-mixing chamber 412. In addition, four atomizing medium passages 403c formed in the disk portion 403 of the atomizer head 401 are connected at their downstream ends to the radially outer ends of the atomizing medium supply ports 410b'.

FIG. 7C shows a second modification of the embodiment shown in FIG. 7A having a different form of the atomizing medium supply port 410b. In this case, the atomizing fluid supply ports are constituted by four atomizing medium supply ports 410b" which are oriented such that the medium jetted therefrom has a flow component tangential to the radius of the annular pre-mixing chamber 412. At the same time, four atomizing medium passages 403c formed in the disk portion 403 of the atomizer head 401 are connected at their downstream ends to the radially outer ends of the atomizing medium supply ports 410b". In this second modification, the atomizing medium jetted from the atomizing medium supply ports 410b" into the pre-mixing chamber 412 form a swirl which promotes the mixing of the CWM and the atomizing fluid within the pre-mixing chamber 412 so that the atomization of the CWM is enhanced.

FIG. 8B shows a modification of the embodiment shown in FIG. 8A. In this modification, the outer peripheral surface 408a' constituting the small-diameter cylindrical surface 412a' of the pre-mixing chamber 412' is provided with a plurality of spacing projections 408b' having a radial height which is equal to the radial width of the pre-mixing chamber 412'. In this modification, therefore, it is possible to prevent any offset between the axis of the columnar nozzle tip 408' and the ring-shaped nozzle tip 410, so that a uniform width of the pre-mixing chamber is ensured. The projections 408b' may be formed spirally so as to cause a spiral flow of the mixture of the CWM and the atomizing medium within the pre-mixing chamber 412'.

Sixth Embodiment

Figure 9:
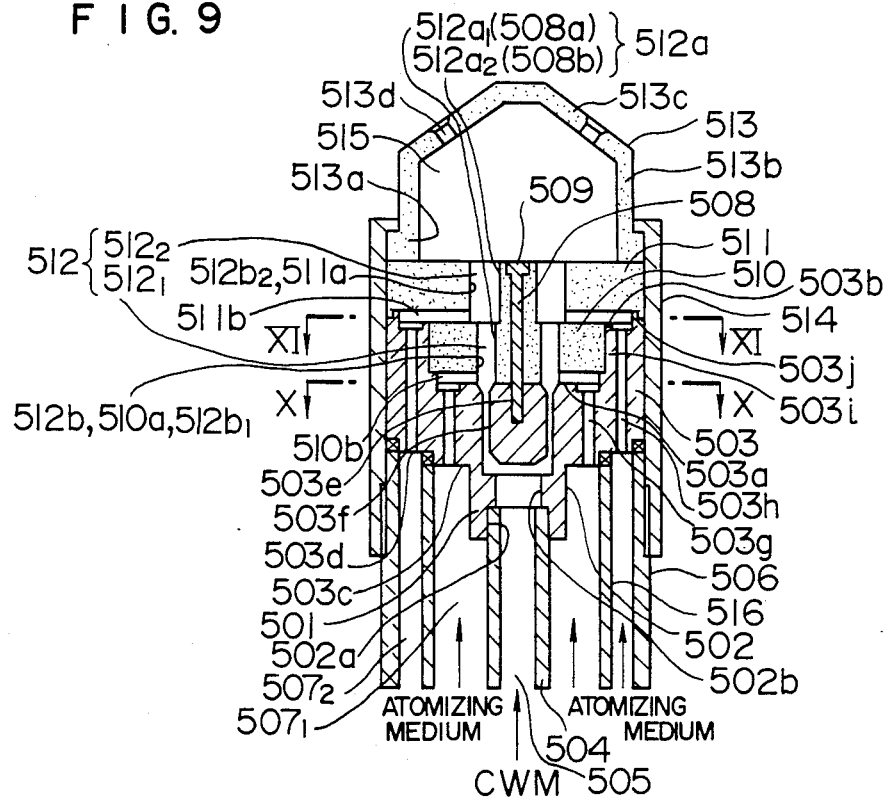
FIG. 9 is a sectional view of a sixth embodiment of the atomizer in accordance with the present

FIG. 9 is a sectional view of a sixth embodiment of the atomizer of the invention. FIGS. 10 and 11 are cross-sectional views taken along the lines X—X and XI—XI of FIG. 10. The atomizer head 501 has a cylindrical portion 502 and a disk portion 503 integrally connected to the downstream end (upper side as viewed in FIG. 1) of the cylindrical portion 502. The disk portion 503 has a diameter greater than the diameter of the cylindrical portion 502. The cylindrical portion 502 has a bore which is constituted by large-diameter portion 502a on the upstream end and a small-diameter portion 502b on the downstream end. A recess having a circular cross-section is formed in the center of the downstream end surface of the disk portion 503. Thus, the downstream end surface of the disk portion 503 has a downstream circular end surface 503a constituted by the bottom of the recess and the downstream annular end surface 503b formed on the outer side of the recess. The upstream end surface of the disk portion 503 is constituted by an upstream small-diameter annular end surface 503c around the cylindrical portion 502 and an upstream large-diameter annular end surface 503d formed on the outer side of the end surface 503c. A female thread portion 503e opening to the downstream side is provided on the center of the downstream circular end surface 503a. A plurality of, e.g., 8, cylindrical mixing-object fluid passages 503f are formed around the female-thread portion 503e on a circle centered at the axis of the latter. In this embodiment, the mixing-object fluid passages 503f are used as the passages 503f for the CWM. The CWM passages 503f are connected at their upstream ends to the small-diameter portion 502b of the bore in the cylindrical portion 502, while the downstream end of the same opens in the downstream circular end surface 503a of the cylindrical portion 503. A plurality of, e.g., 16, inner admixture fluid passages 503g are formed on the radially outer side of the CWM passages 503f of the disk portion 503 at a constant pitch on a circle centered at the female threaded portion 503e. In this embodiment, the inner admixture fluid passages 503g are used as inner atomizing fluid passages 503g for an atomizing fluid such as steam. The inner atomizing fluid passages 503g extend through the disk portion 503 from the upstream small-diameter annular end surface 503g to the downstream circular end surface 503a. A plurality of, e.g., 16, outer admixture fluid passages 503h are formed on the radially outer side of the inner atomizing medium passages 503g at a constant pitch on a circle centered at the axis of the female thread portion 503e. In this embodiment, the outer admixture fluid passages 503h are used as outer atomizing fluid passages 503h for an atomizing fluid such as steam. The outer atomizing medium passages 503h extend through the disk portion 503 from the upstream large-diameter annular end surface 503d to the downstream annular end surface 503b. A step 503i is formed on the side wall of the circular recess formed in the downstream end of the disk portion 503, at a position slightly spaced from the downstream circular end surface 503a. At the same time, an annular protrusion 503j is formed on the outer peripheral portion of the downstream annular end surface 503b.

An inner tube 504 fits in the large-diameter portion 502a of the bore in the cylindrical portion 502. A mixing-object fluid passage 505 is formed in this inner tube 504. The mixing-object fluid passage 505 is communicated with the plurality of cylindrical CWM passages 503f through the bore in the cylindrical portion 502. In this embodiment, the mixing-object fluid passage 505 is used as the CWM passage 505 for passing the CWM which is the fuel. An outer tube 504 is provided to surround the inner tube 504. The downstream end surface of the outer tube 506 abuts the upstream large-diameter end surface 503d of the cylindrical portion 503 and the outside diameter of the outer tube 506 is the same as that of the disk portion 503. A male thread 506a is formed on the portion of the outer surface of the outer tube 506 immediately upstream from the portion of the outer surface having the same diameter as the disk portion 503. A partition tube 516 is formed between the outer tube 506 and the inner tube 504. The downstream end surface of the partition tube 516 is fixed to the upstream small-diameter end surface 503c of the disk portion 503.

An annular inner admixture supply passage $507_1$ is defined between the outer peripheral surface of the inner tube 504 and the inner peripheral surface of the partition tube 516. At the same time, an annular outer admixture fluid passage $507_2$ is defined by the outer peripheral surface of the partition tube 516 and the inner peripheral surface of the outer tube 506. In this embodiment, the inner admixture fluid supply passage $507_1$ and the outer admixture fluid supply passage $507_2$ are used, respectively, as an inner atomizing medium supply passage $507_1$ and an outer atomizing medium supply passage $507_2$ for supplying the atomizing medium. The inner atomizing medium supply passage $507_1$ communicates with the inner atomizing medium passages 503g, while the outer atomizing medium supply passage $507_2$ communicates with the outer atomizing medium passages 503h.

A stepped columnar nozzle tip 508 made of a wear-resistant material such as ceramics is connected to the center of the downstream circular end surface 503a of the disk portion 503. The stepped columnar nozzle tip 508 has an upstream large-diameter outer peripheral surface 508a and a downstream small-diameter outer peripheral surface 508b. The fixing of the stepped columnar nozzle tip 508 is accomplished by a nozzle tip retainer 509 having a threaded end which is screwed into the female thread portion 503e in the disk portion 503.

A small-diameter nozzle tip 510 is disposed in the recess formed in the downstream end of the disk portion 503. The small-diameter ring-shaped nozzle tip 510 is held in contact with the step 503i formed in the side wall of the recess. The small-diameter ring-shaped nozzle tip 510 has a cylindrical inner peripheral surface 510a which confronts the large-diameter outer peripheral surface 508a of the stepped columnar nozzle tip 508. The inner peripheral surface 510a of the small-diameter ring-shaped nozzle tip 510 and the large-diameter outer peripheral surface 508a of the nozzle tip 508 cooperate with each other in defining therebetween an annular upstream pre-mixing chamber $512_1$. Thus, the annular upstream pre-mixing chamber $512_1$ is defined by an upstream small-diameter cylindrical surface $512a_1$ presented by the large-diameter outer peripheral surface 508a of the stepped columnar nozzle tip 508 and an upstream large-diameter cylindrical surface $512_1$ presented by the inner peripheral surface 510a of the small-diameter ring-shaped nozzle tip 510. The upstream pre-mixing chamber $512b_1$ communicates with the CWM supply passage 505 through the CWM supply passage 503f. An annular gap formed between the upstream end surface (lower end as viewed in FIG. 9) of the small-diameter ring-shaped nozzle tip 510 and the downstream circular end surface 503a constitutes an upstream admixture fluid supply passage 510b. The upstream admixture fluid supply passage 510b in this embodiment is used as an upstream atomizing medium supply port 510b through which an atomizing medium is supplied. The inner atomizing medium supply passages 503g communicate with the outer peripheral portion of the annular upstream atomizing fluid supply port 510b. The downstream end surface of the small-diameter ring-shaped nozzle tip 510 is flush with the downstream annular end surface 503d of the disk portion 503.

A large-diameter ring-shaped nozzle tip 511 contacts the downstream end of the annular protrusion 503j formed on the downstream annular end surface 503b of the disk portion 503. The large-diameter ring-shaped nozzle tip 511 has a cylindrical inner peripheral surface 511a which opposes to the small-diameter outer peripheral surface 508b of the stepped columnar nozzle tip 508. The inner peripheral surface 511a of the large-diameter ring-shaped nozzle tip 511 and the small-diameter outer peripheral surface 508b of the stepped columnar nozzle tip 508 in combination defines an annular downstream pre-mixing chamber $512_2$. Thus, the annular downstream pre-mixing chamber $512_2$ is defined by the downstream small-diameter cylindrical surface $512a_2$ presented by the small-diameter outer peripheral surface 508b of the stepped columnar nozzle tip 508 and the downstream large-diameter cylindrical surface $512b_2$ presented by the inner peripheral surface 511a of the large-diameter ring-shaped nozzle tip 511. The downstream pre-mixing chamber $512_2$ has a width, i.e., the gap between the downstream small-diameter cylindrical surface $512a_2$ and the downstream large-diameter cylindrical surface $512b_2$, greater than that of the upstream pre-mixing chamber $512_1$.

The downstream pre-mixing chamber $512_2$ and the upstream pre-mixing chamber $512_1$ in combination constitute a pre-mixing chamber 512 in the atomizer of this embodiment. An annular gap formed between the upstream end surface (lower end surface as viewed in FIG. 9) of the large-diameter ring-shaped nozzle tip 511 and the downstream annular end surface 503b of the disk portion 503 constitutes a downstream admixture fluid supply port 511b. The downstream admixture fluid supply port 511b in this embodiment serves as a downstream atomizing medium supply port 511b for introducing the atomizing fluid. The outer atomizing fluid supply passages 503h communicates with the outer peripheral portion of the annular downstream atomizing medium supply port 511b. The large-diameter ring-shaped nozzle tip 511 has an outside diameter which is the same as that of the disk portion 503.

The downstream end surface of the large-diameter ring-shaped nozzle tip 511 underlies a sprayer plate 513 which has the same construction as that in the first embodiment. The sprayer plate 513 constitutes a later-mentioned mixing chamber and is provided with an upstream end flange portion 513a, a cylindrical wall 513b and a substantially conical crown portion 513c. The outside diameter of the flange portion 513a is the same as that of the disk portion 503. The crown portion 513c is provided with a plurality of, e.g., 4, spray ports which are arranged radially so that the spray diverges radially outwardly. In order to prevent wear or abrasion by atomized CWM particles which are introduced at high velocity into the mixing chamber, the sprayer plate 513 is made of a material having a high wear resistance such as ceramics.

The flange portion 513a of the sprayer plate 513, the large-diameter ring-shaped nozzle tip 511, the disk portion 503 and the downstream end portion of the outer tube 506 have an identical outside diameter which corresponds to the inside diameter of a cylindrical wall portion 514a of a cap nut 514 having the same construction as that of the first embodiment. The cap nut 514 has the cylindrical wall 514a and an end wall 514 having a through hole penetrated by the cylindrical wall 513b of the sprayer plate 513. A female screw thread 514c for engagement with the male screw thread 506a on the outer tube 506 is formed in the opened upstream end portion of the cylindrical wall 514a. As the cap nut 514 is screwed through mutual engagement between the male screw thread 506a and the female screw thread 514c, the end wall 514b is pressed onto the flange portion 513a of the sprayer plate 513, so that the sprayer plate 513, large-diameter ring nozzle tip 511, atomizer head 501 and the outer tube 506 are rigidly fixed to one another.

The mixing chamber 515 mentioned before is formed of the sprayer plate 513, large-diameter ring-shaped nozzle tip 511 and the stepped columnar nozzle tip 508. The mixing chamber 515 is communicated with the pre-mixing chamber 512. The mixing chamber 515 has a cross-section greater than that of the pre-mixing chamber 512.

In operation, the CWM as the fuel is supplied to the annular upstream pre-mixing chamber $512_1$ from the CWM supply passage 505 through the plurality of CWM passages 503f. The CWM flowing in the upstream pre-combustion chamber $512_1$ has the form of a thin liquid film having an annular cross-section. The atomizing medium which is jetted through the upstream atomizing medium supply port 510b into the upstream pre-mixing chamber $512_1$ at a high velocity intercepts the flow of the CWM in the form of the thin liquid film. In other words, the atomizing medium jetted from the upstream atomizing medium supply port 510b has a flow component which is perpendicular to the flow of the CWM. In consequence, the CWM in the form of a thin liquid film is effectively fractured by the force produced by the turbulency of the atomizing medium and by the force produced by the momentum of the atomizing medium. The thus formed mixture of the CWM and the atomizing medium flows as a thin liquid film into the downstream pre-mixing chamber $512_2$. The atomizing medium jetted at a high speed from the downstream atomizing medium supply port 511b into the downstream pre-mixing chamber $512_2$ is so oriented as to intercept the flow of the thin liquid film consisting of the CWM and the atomizing medium. It is, therefore, possible to effectively crush and fraction the thin liquid film of the mixture by the force produced by the turbulency of the atomizing medium and the force produced by the momentum. It is, therefore, possible to reduce the weight of the atomizing medium necessary for atomizing the CWM, by optimumly controlling the factors such as the kind and the flow rate of the atomizing medium which is introduced from the upstream and downstream atomizing medium supply ports 510b and 511b into the upstream and downstream pre-mixing chambers $512_1$ and $512_2$.

Seventh Embodiment

FIG. 12 is a sectional view of a seventh embodiment of the atomizer in accordance with the present invention, while FIG. 13 is a sectional view taken along the line XIII—XIII of FIG. 12. The seventh embodiment of the atomizer has a construction which is substantially the same as that of the atomizer shown in FIG. 6, except that the mixing-object fluid supply passage 605 formed in the inner tube 604 is used as an atomizing medium supply passage 605 for supplying the atomizing medium, while the admixture fluid supply passage 607 formed between the inner tube 604 and the outer tube 606 is used as a CWM supply passage 607. Other points of difference reside in that the number of the mixing-object fluid passages 603b formed in the disk portion 603 of the atomizer head 601 is 16, and that the number of the admixture fluid passages 603b is 16, unlike the embodiment shown in FIG. 6 in which these numbers are 8. The seventh embodiment also is discriminated from the embodiment shown in FIG. 6 in that the mixing-object fluid passage 603b is used as an atomizing medium passage, while the admixture fluid passage 603c is used as a CWM passage. A ring-shaped recess is formed in the upstream end surface of the ring-shaped nozzle tip 610. The ring-shaped recess cooperates with the downstream end surface of the disk portion 603 of the atomizer head 601 so as to define an admixture fluid supply port 610b. In contrast to the embodiment shown in FIG. 6 in which the ring-shaped admixture fluid supply port 610b is used for the atomizing medium, the ring-shaped admixture supply port 610b in this embodiment is adapted for supplying the CWM. Other portions are materially the same as those in the embodiment shown in FIG. 6.

In operation, the atomizing medium is supplied from the mixing-object fluid supply passage 605. This atomizing medium flows through the pre-mixing chamber 612 through the mixing-object fluid passage 603b. Meanwhile, the CWM supplied from the admixture fluid supply passage 607 flows through the plurality of admixture fluid passages 603c and is introduced into the ring-shaped admixture fluid supply port 610b. Then, the flow of the CWM is deflected such as to have a flow component which is perpendicular to the direction of flow of the atomizing medium and is then jetted into the pre-mixing chamber 612. As in the case of the embodiment shown in FIG. 6, the admixture fluid, which in this case is the CWM, is uniformly supplied from the admixture fluid supply port 610b into the pre-mixing chamber 612 because the admixture fluid supply port 610b has a ring-like form. In consequence, it is possible to eliminate any local variation in the gas-liquid flow-rate ratio in the pre-mixing chamber 612. The mixture fluid consisting of the CWM and the atomizing medium flows through the pre-mixing chamber 612 in the form of a turbulent thin annular liquid film, so that the CWM is efficiently mixed with the atomizing medium and, hence, is atomized in good order.

Eighth Embodiment

FIG. 14 is a sectional view of an eighth embodiment of the atomizer in accordance with the present invention, while FIG. 15 is a sectional view taken along the line XV—XV of FIG. 14. The atomizer head 701 has a cylindrical portion 702 and a disk portion 703 formed integrally on the downstream end (upper side as viewed in FIG. 1) of the cylindrical portion 702. The disk portion 703 has an outside diameter greater than that of the cylindrical portion 702. The cylindrical portion 702 has an internal bore which is constituted by an upstream (lower side as viewed in FIG. 14) large-diameter portion 702a and a downstream small-diameter portion 702b. A downstream circular projection 703a having a circular cross-section is formed on the center of the downstream end surface of the disk portion 703. Thus, the downstream end surface of the disk portion 703 has the downstream circular projection 703a and a downstream annular end surface 703b. The upstream end surface of the disk portion 703 has an upstream small-diameter annular end surface 703c inside the cylindrical portion 702 and an upstream large-diameter annular end surface 703d outside the cylindrical portion 702. An opening $703c_1$ is formed in the center of the upstream small-diameter annular end surface 703c. On the other hand, a female screw thread 703e is formed on the center of the downstream circular projection 703a so as to open to the downstream side. A plurality of, e.g., 8, cylindrical inner admixture fluid passages 703f are formed on the outer side of the female thread portion 703e of the disk portion 703 on a circle which is centered at the female-thread portion 703e. In this embodiment, the inner admixture fluid passages 703f are used as inner CWM passages 703f for introducing the CWM. Each inner CWM passage 703f communicated at its upstream end with the opening $703c_1$ while the downstream end opens in the downstream annular end surface $703b$. A plurality of, e.g., 16, mixing-object fluid passages $703g$ are formed in the disk portion on the outer side of the CWM flow passages $703f$ on a circle centered at the axis of the female-thread portion $703e$. In this embodiment, the mixing-object fluid passages $703g$ are used as atomizing medium passages $703g$ for introducing the atomizing medium. Each atomizing medium passage $703g$ extends through the disk portion $703$ from the upstream small-diameter annular end surface $703c$ to the downstream annular end surface $703b$. A plurality of, e.g., 16, outer admixture fluid passages $703h$ are formed in the disk portion $703$ on the outer side of the atomizing medium passages $703g$ on a circle centered at the female-thread portion $703e$. In this embodiment, the outer admixture fluid passages $703h$ are used as outer CWM passages $703h$ through which the CWM is introduced. The outer CWM passages $703h$ extend through the disk portion $703$ from the upstream large-diameter annular end surface $703d$ to the downstream annular end surface $703b$.

An inner tube $704$ fits in and is connected to the large-diameter portion $702a$ of the bore in the cylindrical portion $702$ at its downstream end. An outer tube $706$ is disposed to surround the inner tube $704$. The downstream end of the outer tube $706$ is held in contact with the outer peripheral portion of the upstream large-diameter annular end surface $703d$ of the disk portion $703$ and has an outside diameter which is the same as that of the disk portion $703$. A male thread $706a$ is formed on the portion of the outer surface of the outer tube $706$ immediately upstream from the portion of the outer surface having the same diameter as the disk portion $703$. A partition tube $716$ is formed between the outer tube $706$ and the inner tube $704$. The downstream end surface of the partition tube $716$ is fixed in and connected to a central opening $703c_1$ of the upstream small-diameter annular end surface $703c$ of the disk portion $703$.

A mixing-object fluid passage $705$ is formed between the partition tube $716$ and the inner tube $704$. The mixing-object fluid supply passage $705$ communicates with the plurality of cylindrical atomizing medium passages $703g$. Thus, in the eighth embodiment, the mixing-object fluid passage $705$ is used as an atomizing medium supply passage $705$. An inner admixture fluid supply passage $707_1$ is formed inside the partition tube $716$. The inner admixture fluid supply passage $707_1$ communicates with the plurality of cylindrical inner CWM passages $703f$ through the interior of the above-mentioned opening $707_1$. Thus, in the eighth embodiment, the inner admixture fluid supply passage $707_1$ is used as an inner CWM supply passage, i.e., an inner fuel supply passage, $707_1$ for supplying the CWM. An annular outer admixture fluid supply passage $707_2$ is formed between the inner tube $704$ and the outer tube $706$. In this embodiment, the outer admixture fluid supply passage $707_2$ is used as an outer CWM supply passage $707_2$ for supplying the CWM. The outer CWM supply passage $707_2$ is communicated with the outer atomizing passages $703h$.

A columnar nozzle tip $708$ made of a wear-resistant material such as ceramics is connected to the downstream circular projection $703a$ of the disk portion $703$. The connection is achieved by a nozzle tip retainer $709$ having a threaded end adapted to be screwed to the female-thread portion $703e$ in the disk portion $703$ through the columnar nozzle tip $708$. The outside diameter of the columnar nozzle tip $708$ is greater than the outside diameter of the downstream circular projection $703a$ of the disk portion $703$. Therefore, a ring-shaped gap constituting an inner admixture fluid supply port $710b_1$ is formed between the upstream end surface of the columnar nozzle tip $708$ projecting radially outwardly from the downstream circular projection $703a$ and the downstream annular end surface $703b$ of the disk portion $703$. In the eighth embodiment, the ring-shaped inner admixture fluid supply port $710b_1$ serves as an inner CWM supply port $710b_1$ for supplying the CWM. A ring-shaped nozzle tip $710$ is disposed outside the columnar nozzle tip $708$. A ring-shaped recess is formed in the upstream end surface of the ring-shaped nozzle tip $710$. The ring-shaped recess cooperates with the downstream annular end surface $703b$ of the disk portion $703$ an outer admixture fluid supply port $710b_2$. In this eighth embodiment, the ring-shaped outer admixture fluid supply port $710b_2$ serves as an outer CWM supply port $710b_2$ for supplying the CWM.

In this eighth embodiment, an annular pre-mixing chamber $712$ is defined by the inner peripheral surface $710a$ of the ring-shaped nozzle tip $710$ and the outer peripheral surface $708a$ of the columnar nozzle tip $710$. Thus, in this embodiment, the small-diameter cylindrical surface $712a$ and the large-diameter cylindrical surface $712b$ defining the pre-mixing chamber are presented by the outer peripheral surface $708a$ of the columnar nozzle tip $708$ and the inner peripheral surface $710a$ of the ring-shaped nozzle tip $710$. A plurality of atomizing medium passages $703g$ are connected at their downstream ends to the upstream end of the pre-mixing chamber $712$. Therefore, the atomizing medium supply passage $705$ is communicated with the pre-mixing chamber $712$ through the atomizing medium passage $703g$. The inner peripheral portion of the ring-shaped inner CWM supply port $710b_1$ communicates with the inner CWM passages $703f$ formed in the disk portion $703$. Consequently, the inner CWM passage $707_1$ communicates with the inner CWM supply port $710b_1$ through a plurality of inner CWM passages $703f$. At the same time, the outer peripheral portion of the ring-shaped outer CWM supply port $710b_2$ is communicated with the outer CWM passages $703h$ formed in the disk portion $703$, In consequence, the outer CWM supply passage $707_2$ communicates with the outer CWM supply port $710b_2$ through the outer CWM passages $703h$.

The outside diameter of the large-diameter ring-shaped nozzle tip $710$ is identical to the outside diameter of the disk portion $703$.

A sprayer plate $713$ similar to that in the first embodiment is provided on the downstream end surface of the ring-shaped nozzle tip $710$. The flange portion $713a$ of the sprayer plate $713$ has the same outside diameter as the disk portion $703$. The flange portion $713a$ of the sprayer plate $713$, ring-shaped nozzle tip $710$, disk portion $703$ and the downstream end portion of the outer tube $706$ have an identical outside diameter corresponding to the inside diameter of the cylindrical wall $714a$ of a cap nut $714$ which has a construction similar to that of the cap nut in the first embodiment. As in the case of the first embodiment, the female screw thread $714c$ in the cap nut $714$ is screwed to the male screw thread $706a$ of the outer tube $706$, thereby rigidly fixing the sprayer plate $713$, ring-shaped nozzle tip $710$, atomizer head $701$ and the outer tube $706$ to each other.

The sprayer plate $713$, columnar nozzle tip $708$ and the ring-shaped nozzle tip $710$ in combination define a mixing chamber 715. The mixing chamber 715 communicates with the pre-mixing chamber 712 and has a cross-section greater than that of the pre-mixing chamber 712.

In this eighth embodiment, the atomizing medium is supplied into the annular cross-sectioned pre-mixing chamber 712 from the mixing-object fluid supply passage (atomizing medium supply passage) 705 through the atomizing medium passages 703g. The atomizing medium flowing through this pre-mixing chamber is in the form of a thin liquid film having an annular cross-section. At the same time, the inner CWM supply port 710$b_1$ and the outer CWM supply port 710$b_2$ are disposed to oppose to each other. The flow of the CWM jetted from the CWM supply port 710$b_1$ and the flow of the CWM jetted from the supply port 710$b_2$ are directed to intercept the flow of the atomizing medium in the form of a thin liquid film, i.e., the CWM from each supply port has a flow component which is perpendicular to the direction of flow of the atomizing medium. In consequence, the atomizing medium and the CWM are mixed with each other since the CWM flows to intercept the flow of the atomizing medium in the form of a thin liquid film. The mixture thus formed from the atomizing medium and the CWM has the form of a turbulent thin liquid film, so that the atomizing medium and the CWM are sufficiently mixed with each other, whereby the CWM is effectively fractured and atomized. In addition, the flow of the CWM jetted into the pre-mixing chamber 712 from the inner CWM supply port 710$b_1$ and the flow of the CWM jetted into the pre-mixing chamber 712 from the outer CWM supply port collide with each other. As a result of the collision, the CWM particles are crushed to promote the atomization.

Jetting of the CWM from only one of the small-diameter cylindrical surface 712a and the large-diameter cylindrical surface 712b of the pre-mixing chamber may cause the following inconvenience. Namely, when the velocity of the CWM jetted from one of these cylindrical surfaces is too large, part of the CWM is allowed to collide with the other cylindrical surface without being mixed with the atomizing medium, and is then atomized while flowing along the other cylindrical surface. The atomization of the CWM flowing on the other cylindrical surface, however, is extremely difficult partly because the flow velocity of the atomizing medium is rather slow in the region near the wall surface and partly because the CWM encounters frictional resistance produced by the wall surface. In consequence, the part of the CWM which has reached the other cylindrical surface tends to form comparatively coarse CWM particles. In the eighth embodiment of the present invention, however, this problem is obviated by virtue of the fact that the inner atomizing medium supply port 710$b_1$ and the outer atomizing medium supply port 710$b_2$ are arranged to oppose to each other.

A problem is also encountered that, when the rate of supply of the CWM is decreased, the rate of radiation of heat from the flame for igniting the atomized CWM particles from the pre-mixing chamber 715 is decreased so that the ignitability and the stability of the flame are deteriorated. In such a case, it is possible to recover the stability and the ignitability by supplying a burning assist agent from one of the inner and outer CWM supply ports 710$b_1$ and 710$b_2$. In such a case, the CWM and the burning assisting agent such as a heavy oil are uniformly mixed with each other, so that the consumption of the burning assisting agent such as a heavy oil can be reduced as compared with the conventional method in which separate atomizers are used for the CWM and for the burning assisting agent.

Furthermore, the fluid supplied from either one of the inner and the outer CWM supply ports 710$b_1$ and 710$b_2$ may be any suitable fluid such as water or an agent for controlling the state or property of the CWM such as the temperature and the viscosity of the CWM.

Ninth Embodiment

FIG. 16 is a sectional view of a ninth embodiment of the atomizer in accordance with the present invention. The atomizer head 801 has a cylindrical portion 802 and a disk portion 803 integrally formed on the downstream end (upper end as viewed in FIG. 1) of the cylindrical portion. The disk portion 803 has a greater diameter than the cylindrical portion 802. The cylindrical portion 802 has a bore constituted by an upstream large-diameter portion (lower portion as viewed in FIG. 1) 802a and a downstream small-diameter portion 802b.

A female-thread portion 803b opening to the downstream side is formed in the center of the downstream end surface 803a of the disk portion 813. The upstream end surface of the disk portion 803 has an upstream small-diameter annular end surface 803c formed on the outer side of the cylindrical portion 802 and an upstream large-diameter annular end surface 803d formed on the outer side of the small-diameter annular end surface 803c. A plurality of, e.g., 8, cylindrical mixing-object fluid passages 803e are formed on the outer side of the female thread portion 803b of the disk portion 803 on a circle which is centered at the female thread portion 803b. In this embodiment, the mixing-object fluid passages 803e are used as CWM passages 803e for introducing the CWM. The CWM passages 803e communicate at their upstream ends with the small-diameter portion 802b of the bore in the cylindrical portion 802, and are opened at their upstream ends in the lower end surface 803a of the disk portion 803. A plurality of, e.g., 16, inner admixture fluid passages 803f are formed on the outer side of the CWM passages 803e at a constant pitch on a circle which is centered at the female thread portion 803b. In this embodiment, the inner admixture fluid passages 803f are used as the inner atomizing medium passages 803f for introducing the atomizing medium such as steam. The inner atomizing medium passages 803f extend through the disk portion from the upstream small-diameter annular surface 803c to the downstream end surface 803a. A plurality of e.g., 16, outer admixture fluid passages 803g are formed in the disk portion 803 on the outer side of the inner atomizing medium passages 803f at a constant pitch on a circle which is centered at the female thread portion 803b. In this ninth embodiment, the outer admixture fluid passages 803g are used as an outer atomizing medium passages for introducing an atomizing medium containing an oxidizing agent such as air or oxygen. The outer atomizing medium passages 803g extends through the disk portion 803 from the upstream large-diameter annular end surface 803d to the downstream end surface 803a.

An inner tube 804 is received in and fixed to the large-diameter portion 802a of the bore in the cylindrical portion 802. A mixing-object fluid supply passage 805 is formed in the inner tube 804. The mixing object fluid supply passage 805 is communicated with the plurality of cylindrical CWM passages 803e through the cylindrical CWM passages 803e. In this embodiment, the mixing-object fluid passage 805 is used as a CWM supply passage, i.e., a fuel supply passage, 805. An outer pipe 806 is connected to the outer side of the inner tube 804. The downstream end of the outer tube 806 contacts the outer peripheral portion of the upstream large-diameter annular end surface 803d of the disk portion 803 and has an outside diameter which is the same as that of the disk portion 803. The portion of the outer peripheral surface of the outer tube 806 immediately upstream from the portion having the same diameter as the disk portion 803 is provided with male screw thread as at 806a. A partition tube 816 is disposed between the outer tube 806 and the inner tube 804. The partition tube 816 is connected at its downstream end to the outer peripheral portion of the upstream small-diameter annular end surface 803c.

An annular inner admixture fluid supply passage $807_1$ is formed between the outer peripheral surface of the inner tube 804 and the inner peripheral surface of the partition pipe 816. An annular outer admixture fluid supply passage $807_2$ is formed between the outer peripheral surface of the partition tube 816 and the inner peripheral surface of the outer tube 806. The inner admixture fluid supply passage $807_1$ and the inner admixture fluid supply passage $807_2$ are used, respectively, as an inner atomizing medium supply passage $807_1$ and the outer atomizing medium supply passage $807_2$ for supplying the atomizing medium, respectively. The inner atomizing medium supply passage $807_1$ is communicated with the inner atomizing medium passages 803f, while the outer atomizing medium supply passage $807_2$ is communicated with the outer atomizing medium passages 803g.

A nozzle tip 808 made of a wear-resistant material such as ceramics is fixed to the center of the downstream end surface 803a of the disk portion 803. The fixing of the nozzle tip 808 is accomplished by a nozzle tip retainer 809 having a threaded end screwed to the female thread 803b of the disk portion 803 through the nozzle tip 808.

A nozzle tip holder 810 having an outside diameter which is equal to that of the disk portion 803 is provided on the downstream end of the outer peripheral portion of the downstream end surface 803a of the disk portion 803. A ring-shaped recess 810a is formed on the inner peripheral surface of the nozzle tip holder 810. The cylindrical nozzle tip holder 810 has a plurality of atomizing medium flow passage 810b arranged on a circle centered at the female thread portion 803b. The atomizing medium passages 810b extend through the nozzle tip holder from the upstream end surface to the downstream end surface thereof. These atomizing medium passages 810b are communicated with the atomizing medium passages 803g. A ring-shaped nozzle tip 811 is fixed to the inner peripheral surface of the nozzle tip holder 810. The ring-shaped nozzle tip 811 has a cylindrical inner peripheral surface 811a which opposes the outer peripheral surface 808a of the columnar nozzle tip 808. The inner peripheral surface 811a of the ring-shaped nozzle tip 811 and the outer peripheral surface of the ring-shaped nozzle tip 808 cooperate with each other in defining therebetween an annular pre-mixing chamber 812. Thus, the pre-mixing chamber is defined by a small-diameter cylindrical surface 812a presented by the outer peripheral surface 808a of the columnar nozzle tip 808 and a large-diameter cylindrical surface 812b presented in the inner peripheral surface 811a of the ring-shaped nozzle tip 811. The pre-mixing chamber 812 communicates with the CWM supply passage 805 through the CWM passages 803e. An annular gap is defined between the upstream end surface 811b (lower end surface as viewed in FIG. 9) of the ring-shaped nozzle tip 811 and the downstream end surface 803a of the disk portion 803. An annular inner admixture fluid supply port 811c is defined between this gap and a recess 810a formed in the nozzle tip holder 810. In this embodiment, the inner admixture fluid supply port 811c serves as an inner atomizing medium supply port 811c for supplying the atomizing medium. The inner atomizing medium passage 803f communicates with the outer peripheral portion of the annular inner atomizing medium supply port 811c.

The nozzle tip holder 810, ring-shaped nozzle tip 811 and the columnar nozzle tip 808 have downstream end surfaces which are flush with one another. A sprayer plate 813 is disposed on the downstream side of these downstream end surfaces. The sprayer pate 813 has an upstream end flange portion 813a, a cylindrical wall portion 813b and a substantially conical crown portion 813c. The flange portion 813a has an outside diameter which is the same as the outside diameter of the disk portion 803. A plurality of e.g., four, spray ports 813d are arranged radially in the crown portion 813c such that the flow of the fluid sprayed therefrom diverges radially. A plurality of atomizing medium nozzle 813e are formed in the cylindrical wall portion 813b of the sprayer plate 813. These atomizing medium nozzles 813e are communicated at their upstream ends with the nozzle tip holder 810, while the downstream end of the same is connected to a swirler 813f which is provided on the outer surface of the sprayer plate 813. The swirler 813f is constructed such as to jet the atomizing medium around the outer surface of the crown portion 813c of the sprayer plate 813. Therefore, the atomizing medium discharged from the swirler 813f serves to form a swirl of the fluid sprayed from the spray ports 813d of the crown portion 813c, i.e., the mixture of the CWM and the atomizing medium.

In order to prevent wear or abrasion of the wall surface of the sprayer plate 813 by the atomized particles of CWM flowing into the sprayer plate 813 at a high velocity, the sprayer plate 813 is made of a material having a high resistance to wear, e.g., ceramics.

As explained before, the flange portion 813a, nozzle tip holder 810, disk portion 803 of the atomizer head 801 and the downstream end portion of the outer tube 806 have an identical outside diameter which corresponds to the inside diameter of the cylindrical portion 814a of the cap nut 814. The cap nut 814 has the cylindrical wall 814a and an end wall 814b having a through hole penetrated by the cylindrical wall 813b of the sprayer plate 813. A female screw thread 814c is formed in the inner peripheral surface of the cylindrical wall 814a. As in the case of the first embodiment, the female screw thread of the cap nut 814 is screwed onto the male screw thread 806a of the outer tube 806 thereby rigidly fixing the sprayer plate 813, nozzle tip holder 810, atomizer head 801 and the outer tube 806.

The sprayer plate 813, columnar nozzle tip 808 and the ring-shaped nozzle tip 811 in combination define a mixing chamber 815. The mixing chamber 815 is communicated with the pre-mixing chamber 812 and has a cross-section greater than that of the latter.

In operation of this embodiment, the CWM and the atomizing medium are mixed in the pre-mixing chamber 812 as in the case of the fifth embodiment described before. The mixture fluid consisting of the atomized CWM and the atomizing medium formed in the pre-mixing chamber 812 is then introduced into the mixing chamber 815 and then atomized through the spray ports 813d.

It is known to burn CWM at a high pressure in, for example, a CWM gasification furnace. In such a case, the pressure in the reaction vessel is as high as several tens of atm and the inside diameter of the reaction vessel is about ⅓ to 1/10 of the boiler used in normal power station. In such a case, therefore, it is necessary to prevent the particles sprayed from the spray ports 813d from colliding with the opposing wall of the vessel, and to promote the mixing of the CWM and an oxidizer. To this end, it is necessary to minimize the velocity of the mixture fluid from the spray ports of the sprayer plate 813. This is necessary also for the purpose of improving the reaction ratio, i.e., the gasification ratio, of the CWM.

In order to cope with these demands, the ninth embodiment of the atomizer of the invention can supply an oxidizing agent through the inner atomizing medium supply passage $807_1$ at a rate corresponding to the gas-liquid flow-rate ratio necessary for the atomization, and remainder part of the oxidizing agent through the outer atomizing medium supply passage $807_2$.

The oxidizing agent (atomizing medium) supplied from the outer atomizing medium supply passage $807_2$ reaches the swirler 813f through the atomizing medium nozzle $813_e$ and is sprayed from the swirler 813f along the outer surface of the sprayer plate 813, thereby contributing to the formation of the swirl of the particles sprayed from the spray ports 813d. In consequence, the flow of the atomized particles is drastically decelerated and, in addition, the CWM is rapidly mixed with the oxidizing agent necessary for the gasification.

In all the embodiments described hereinbefore, the position where the contact between the atomizing medium and the CWM in the pre-mixing chamber is important because the distance between this position and the mixing chamber is a significant factor for attaining good mixing of these fluids. Namely, the distance between the position mentioned above and the mixing chamber has to be selected so as to ensure sufficient mixing between the CWM and the atomizing medium. In each of the described embodiments, it has been confirmed that a good mixing can be attained when the above-mentioned distance is 6 mm in the pre-mixing chamber having a thickness of 1.5 mm. Preferably, the distance from the contact position is twice or more the thickness of the pre-mixing chamber, more preferably 3 to 8 times as large as the thickness of the pre-mixing chamber.

Tenth Embodiment

Figure 17:
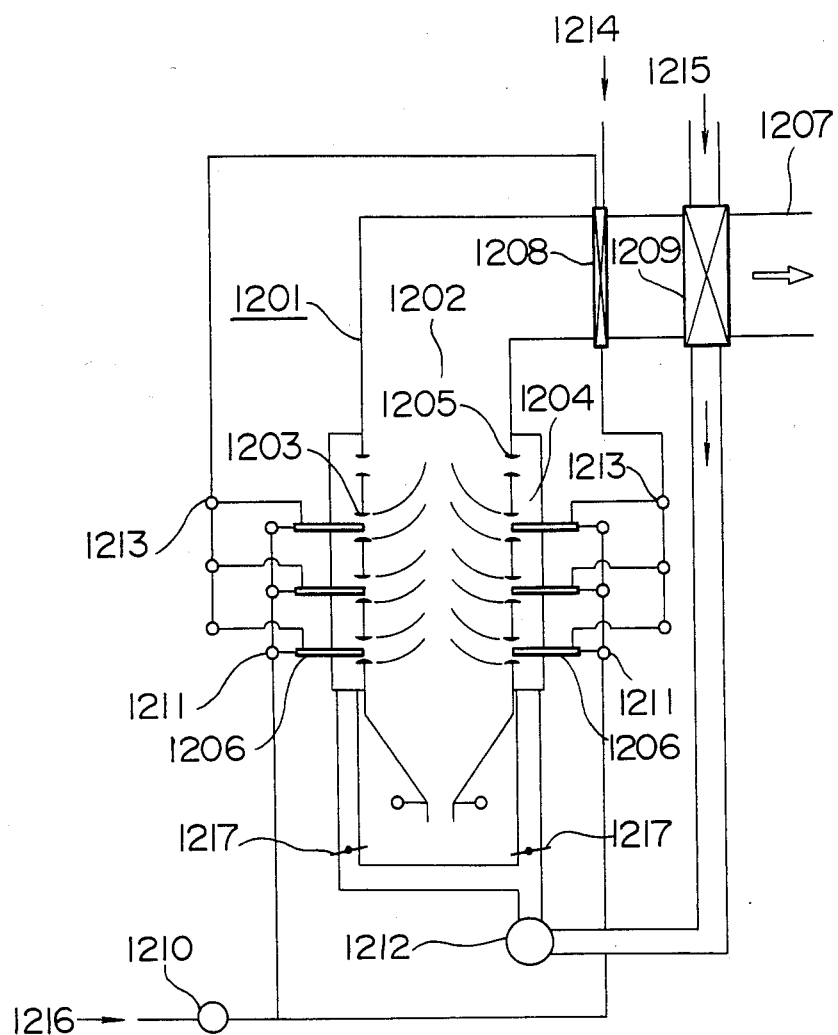
FIG. 17 is a diagrammatic illustration of a CWM boiler as a tenth embodiment of the atomizer in accordance with the present invention.

FIG. 17 shows a system diagram of a CWM fired boiler embodying the present invention. The boiler generally denotes by 1201 has burners 1203 arranged in a plurality of stages and rows and mounted in window boxes 1204 provided in opposing walls of the furnace 1202. The boiler further has burner throats 1205, atomizers 1206 on the respective burners, a steam heater 1208 disposed in a flue 1207 on the upper portion of the furnace 1202, an air heater 1209, a pressure regulator 1213 connected between the steam heater 1208 and the atomizers 1206, a fan 1212 disposed between the air heater 1208 and the window box 1204, an inlet damper 1217 for adjusting the flow rate of the air, a CWM pump 1210 for supplying a CWM as the fuel, and a pressure regulator 1211 for regulating the pressure of the CWM.

The air necessary for burning the CWM is heated by the air heater 1209 and is forced into the window boxes 1204 by the fan 1212. The rate of supply of the heated air is adjusted by the inlet damper 1217. The window boxes 1204 are formed over the entire areas of the opposing walls of the furnace and are adapted for guiding air supplied to the burners arranged in plurality of stages and rows.

Steam 1214 generated in steam generating tubes arranged in the form of a wall is supplied to the atomizer 1206 after being heated by the steam heater 1208 under the pressure control performed by the pressure regulator 1213. The CWM 121 is pressurized by the pump 1210 and is delivered to the atomizer 1206 at a pressure regulated by the pressure regulator 1211.

FIG. 18 shows another CWM fired boiler in accordance with the present invention. The boiler 1201 has a furnace 1202 in which are disposed a secondary heater 1218, a re-heater 1219, a primary heater 1220 and a fuel economizer 1221. Steam is heated in these heaters. More specifically, the steam flows through the economizer 1221, re-heater 1219, primary heater 1220 and the secondary heater 1218 in the mentioned order so as to be progressively heated to higher temperature. The steam of high pressure and temperature thus obtained is used for the purpose of driving a steam turbine. The gas formed as a result of burning of the fuel is restricted by a nose 1222 and is supplied to various steam heaters in the form of a uniform flow of gas. More specifically, the gas is supplied to an air preheater 1209 so as to heat the air supplied thereto and is then discharged to the outside of the boiler. A part of the gas, however, is returned to the furnace 1202 and the burners 1203 by means of a gas recirculating fan 1212. In this embodiment, the distance between the burner 1203 of the final stage and the nose 1222 is as small as 2.6 m per 100 MW of the rated output of the boiler. In this boiler, the height of the nose 222 from the burner can be reduced as mentioned above, because the length of the flame can be reduced by virtue of the use of the atomizers and burners which will be explained hereinunder.

Figure 19:
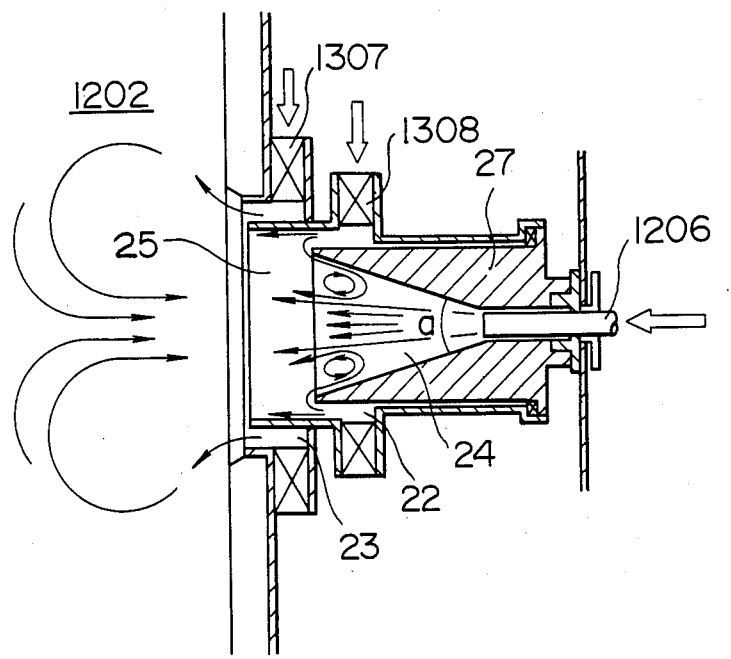
FIG. 19 is a sectional view of a burner suitable for use in a boiler of the present invention.
Figure 20:
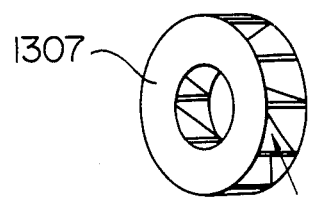
FIG. 20 is a perspective view of a blower for forming a swirl of air.

FIGS. 19 and 20 are illustrations of a burner suitable for use in the boiler of the invention. The burner has the atomizer 1206 for atomizing the CWM as the fuel. The burner also has a primary pre-combustion chamber 24 disposed coaxially with the atomizer 1206 and diverging conically from the end of the atomizer 1206. The burner further has an annular primary air nozzle 22 disposed on the outer periphery of the primary pre-combustion chamber 24 and adapted for discharging air for combustion in the form of a swirl about the axis of the atomizer. The primary air nozzle 22 is defined by an inner sleeve which also serves as the peripheral wall of the primary pre-combustion chamber 24. The inner sleeve of the primary air nozzle has a smaller length than an outer sleeve defining the outer side of this air nozzle, in the direction of the jet of the fuel. A reference numeral 25 designates a secondary pre-combustion chamber defined by the outer sleeve of the primary air nozzle 2 and arranged on the downstream side of the primary pre-combustion chamber 24. A reference numeral 23 designates an annular secondary air nozzle provided on the outer periphery of the secondary pre-combustion chamber 25 and adapted for supplying air in the form of a swirl. The radially inner side of the secondary air nozzle 23 is defined by the outer peripheral wall of the primary air nozzle. Numerals 1307 and 1308 are swirlers or air registers arranged on the inlets of the nozzles 22 and 23, thereby to form swirl of air supplied from these nozzles. A reference numeral 27 designates a block portion of the primary pre-combustion chamber, while a numeral 1202 denotes the furnace.

In operation, the CWM as the fuel is finely atomized and jetted from the atomizer 1206 in the form of extremely fine particles having a mean particle size ranging between about 50 and 100 $\mu$m. The atomized CWM is ignited in the conical primary pre-combustion chamber 24 disposed around the atomizer 1206 and is burnt by the primary air in the cylindrical secondary pre-combustion chamber 25 downstream from the primary pre-combustion chamber 24. Any portion of the CWM which is not burnt in the secondary pre-combustion chamber 25 is burnt in the furnace. In order to promote the atomization of the CWM, the CWM is jetted from the atomizer at a high velocity which is usually 3 to 5 times as high as the combustion air. In addition, the primary air forms a swirl about the axis of the atomizer 206. In consequence, a negative pressure is formed around the CWM so as to induce a part of the primary air, i.e., the atmosphere gas in the secondary pre-combustion chamber hotter than the air in the primary pre-combustion chamber, back into the primary pre-combustion chamber 24. The thus induced hot gas is used for the removal of the water content in the CWM and for the promotion of ignition. The primary air which was not consumed by the ignition is mixed with the CWM in the secondary pre-combustion chamber 25 before the CWM is mixed with the secondary air, thus allowing the CWM to be burnt at a low air-ratio. In consequence, a reducing region is formed so as to reduce the NOx contents. Then, the CWM is mixed with the secondary air from the secondary air nozzle 23 so as to be burnt completely. In order to form the secondary pre-combustion chamber 25, the air outlet of the primary air nozzle 22 is disposed inside the air outlet of the secondary air nozzle 23. The ratio between the portion of the primary air trapped into the primary pre-combustion chamber and the portion of the primary air consumed in the secondary pre-combustion chamber is controlled by varying the strength of the swirl of the primary air. A suitable swirling strength is selected in order to form a stable flame. Thus, the primary air is used for the purpose of the ignition of the CWM and also for the purpose of formation of flame with low air ratio. Therefore, the rate of supply of the primary air is selected to be smaller than the rate required for the perfect burning of the CWM.

The block 27 constituting the primary pre-combustion chamber 24 may be steel. However, heat-resistant ceramics or bricks are preferably used as the material of the block 27, in order to attain a large heat accumulation, as well as a longer life against burning by heat. In general, the CWM burning system is pre-heated by a gaseous or liquid fuel until the furnace temperature rises to a level which is high enough to form a stable flame with the CWM fuel. The use of a material having a large heat accumulation capacity as the material of the block 27 promotes the rise of the furnace temperature as it accumulates much heat, thus facilitating the ignition of the CWM fuel. It is also possible to use a heat-generating material such as a ceramic heater as the material of the block 27. With such an arrangement, it is possible to heat the flow of the CWM by the heat generated by the heat-generating member, thus enabling the control of ignition by the rate of heat generation. The ignitability of the CWM fuel at the time of commencement of the supply thereof is improved by selecting the material of the block 27 in consideration of the heat accumulating or heat generating characteristics. Once a stable flame is formed with the CWM fuel, the problem concerning the ignitability of CM becomes less significant because the block 27 is heated by the heat of the flame.

The provision of the primary pre-combustion chamber 24 as shown in FIG. 19 provides the following advantage, in addition to the supply of the heat for the ignition explained above. Namely, the CWM which is jetted at a high velocity is decelerated before it is mixed with the primary air in the secondary pre-combustion chamber 25, so that the fuel particles can be mixed with air for a longer time. In consequence, it becomes possible to ignite the fuel at a position close to the burner. That is, the formation of the flame in the secondary pre-combustion chamber 25 is facilitated.

For the purpose of deceleration of the CWM fuel, the primary pre-combustion chamber 24 is made as large as possible. A too large size of this chamber, however, causes problems such as later-mentioned deviation or offset of the atomized fuel, as well as deposition of the CWM particles on the wall of the furnace. This means that the size of the primary pre-combustion chamber 24 has to be selected optimumly so as to avoid these problems. In order to prevent deposition of the CWM particles, the opening angle $\alpha$ of divergence of the primary pre-combustion chamber 24 is preferably greater than the atomization angle of the CWM atomizer 1206.

The secondary pre-combustion chamber 25 is formed by an inner sleeve of the annular secondary air nozzle 23. As explained before, the secondary pre-combustion chamber 25 is used for burning the CWM fuel with the primary air. It has been explained also that the formation of a reducing region by low air-ratio combustion is important for decreasing the NOx contents. The provision of the secondary pre-combustion chamber facilitates the formation of the low air-ratio combustion, and provides a distinction between the effect of the primary air and the effect of the secondary air. Since the outlet of the secondary air is disposed downstream from the secondary pre-combustion chamber, the mixing of the secondary air is delayed. On the other hand, the flow of the primary air is prevented by the inner wall of the secondary pre-combustion chamber 25, i.e., the inner sleeve of the secondary air nozzle, from spreading radially outward, the mixing of the CWM with the primary air is promoted so as to facilitate the formation of the flame with low air-ratio. The primary and secondary air nozzles are normally produced from a steel. However, in order to promote the combustion with low air-ratio, the inner walls of these nozzles may be formed from a heat accumulating material such a heat-resistant ceramics or a heat-generating material such as a ceramics heater, as in the case of the block 7.

As has been described, the burner shown in FIG. 19 improves the ignitability of the CWM fuel, and facilitates the formation of a stable flame, thus contributing to an improvement in the combustibility. Furthermore, this burner enables a reducing region to have a large volume partly because the formation of flame with air-ratio is facilitated and partly because the mixing of the secondary air is delayed. The burner shown in FIG. 19 therefore effectively decreases the production of NOx.

The delay of the supply of the secondary air causes the flame to be elongated, thus requiring a greater size of the combustion system. To avoid this problem, it is important to jet the secondary air in the form of a swirl. Namely, the supply of the secondary air in the form of a swirl produces such an effect that a backward flow of the gas from the downstream side towards the combustion system is generated as a result of a formation of a region of negative pressure in the swirl. In consequence, the mixing of the secondary air and the CWM fuel in the downstream portion is promoted so as to prevent the flame from becoming long.

In another embodiment of the boiler in accordance with the present invention, the form of the primary pre-combustion chamber is different from that of the embodiment shown in FIG. 19. Namely, the primary pre-combustion chamber 24 around the CWM atomizer 1206 is increased and is made to have a cylindrical portion of a substantial length downstream from the diverged end, in order to make the combustion chamber to have a large size. This form of the primary pre-combustion chamber 24 enhances the effect of this chamber. It is, however, necessary to attain a high degree of alignment between the axis of the combustion chamber and the axis of the atomizer 1206, otherwise the induction of the primary air is rendered uneven with the result that the jet of the CWM is offset from the axis. Thus, in this embodiment, the fabrication and assembly of the burner parts require a highest degree of care.

Figure 21:
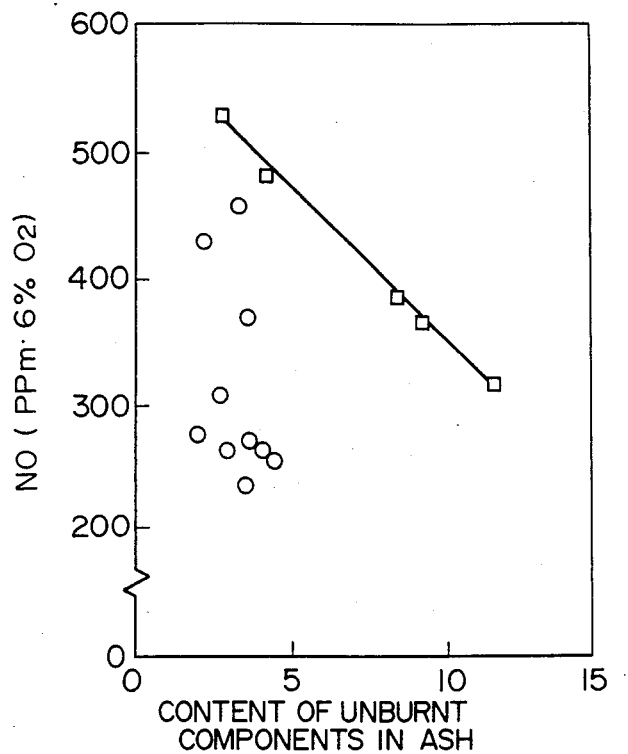
FIG. 21 is a diagram showing the relationship between the content of unburnt substance and the NOx content.

FIG. 21 shows the result of a test burning of a CWM fuel with the burner shown in FIG. 19. For a comparison purpose, a test was conducted also with a low-NOx burner for pulverized coal disclosed in Japanese Patent Laid-Open No. 208305/1984, using a CWM nozzle in place of the pulverized coal nozzle. An identical atomizer was used for both burners. In FIG. 21, the axis of abscissa represents the content of unburnt components in ash collected at the outlet of the burner. Thus, the smaller values on the axis of abscissa represents higher values of the efficiency. The axis of ordinate represents the NOx content as measured at the furnace outlet, in terms of 6% $O_2$ concentration. Obviously, good characteristics of the burners can be represented by smaller content of the unburnt components in the ash and the smaller NOx content. The CWM used in the test was a mixture composed of 63 wt % of Pacific ocean coal and 37 wt % of water. In FIG. 21, the marks □ represent the data obtained with low NOx burner for pulverized coal. The pulverized coal exhibits a higher ignitability as compared with the CWM and the burner disclosed in Japanese Patent Laid-Open No. 208305/1974 ensures a high combustibility, as well as reduced NOx content, even when the mixing between the combustion air and the CWM is conducted for a long time. In contrast, it is rather difficult to simultaneously achieve both the low NOx content and high burning efficiency with the burner for the pulverized coal using the CWM as the fuel, as will be seen from FIG. 21.

In FIG. 21, the marks O show the data obtained with the burner shown in FIG. 19. It will be seen that the burner shown in FIG. 19 enables the CWM to be burnt in a region in which the unburnt content in the ash is small and, hence, is effective in the improvement in the burning efficiency. It is also understood that the emission of NOx can be reduced without being accompanied by a reduction in the burning efficiency. The control of the NOx emission is conducted by suitably selecting the ratio of flow rate between the primary air and the secondary air, as well as the strength of the swirl of the air. It will thus be seen from FIG. 21 that the burner in accordance with the present invention is effective in burning the CWM as the fuel.

In this embodiment, the atomizer explained before as the seventh embodiment is used using the passages 605 and 607 as the passages for supplying the CWM and the atomizing medium, respectively.

In order to prevent abrasion of the wall surfaces by the atomized CWM particles which are jetted at high velocities, the nozzle tips 610, 608 and the sprayer plate 613 are preferably made of a material having a high wear resistance such as ceramics. Examples of ceramics usable as the material of these parts are SiC, $Al_2O_3$, $Si_3N_4$, $Si_3N_4$-$Al_2O_3$, and so forth.

In the atomizer of the type which atomizes the mixture of CWM and an atomizing medium, the mean particle size of the atomized particles is decreased by increasing th density and the velocity of the atomizing medium in the pre-mixing chamber which is on the upstream end of the mixing chamber, as well as by reducing the geometrical width of flow passage. The term "geometrical width" is used to mean the thickness of the annular cross-section when the pre-mixing chamber has an annular cross-section and, when the pre-mixing chamber has a circular cross-section, the diameter of the circle. Since CWM is a fluid which contains solid particles, an unlimited reduction of the geometrical width of the flow passage causes problems such as blocking of the passage with these particles. The inventors therefore made a study to determine the threshold of the geometrical width which can eliminate problem of blocking of the flow passage, both for an annular passage and a circular passage, and found that the threshold width value for the annular passage is about half that for the circular passage. In the atomizer of the invention, a high efficiency of mixing between CWM and the atomizing medium is ensured by virtue of the use of the passage having the annular cross-section in the pre-mixing chamber. This in turn eliminates a problem of coarsening of the particles attributable to local reduction in the gas-liquid flow rate ratio. The width of the passage in the pre-mixing chamber is preferably not greater than 4 mm and more preferably between 1.5 and 2.5 mm. In addition, the annular form may be provided in at least a part of the annular pre-mixing chamber. In this embodiment, the length of the pre-mixing chamber is 6 mm and 10 mm, respectively, when the width of the flow passage is 1.5 mm and 2 mm.

According to the invention, the atomizing medium can contact the CWM at a predetermined angle in the pre-mixing chamber 612, so that the CWM can be atomized without being influenced fluid characteristics of the CWM such as false plasticity or dilatant. In particular, the atomizing medium produces a strong shearing force when it collides with the CWM at a right angle, so that the CWM can be atomized effectively without being substantially influenced by the fluid characteristic of the CWM.

In the described seventh embodiment of the invention (FIG. 12), the atomizing medium and the CWM are supplied to the mixing chamber 615 not in the form of a mere mixture. Rather, the CWM is sufficiently atomized by the atomizing medium in the pre-mixing chamber 612 before introduced into the mixing chamber 615. In consequence, the mixing of the CWM and the atomizing medium is conducted in a very efficient manner in the mixing chamber and the mean particle size of the atomized CWM particles can be reduced remarkably. The mixing of the CWM and the atomizing medium can be effected satisfactorily in the pre-mixing chamber, even when the rate of supply of the CWM is reduced. This in turn makes it possible to obtain a large turn-down ratio which is the ratio between the maximum CWM supply rate and the minimum CWM supply rate which enable the mean particle size of the atomized CWM particles below a predetermined value under the condition of a constant gas-liquid flow rate ratio.

The CWM supply port 603b is constituted by the side wall of the nozzle tip 610 perpendicular to the axis of the atomizer and the side wall of the atomizer head 603, so that the CWM can be jetted at a right angle to the direction of jet of the atomizing medium. This form of the CWM supply port 603b, however, is not exclusive and the same effect is obtainable with a plurality of supply ports having a circular cross-section formed in the large-diameter cylindrical surface of the pre-mixing chamber. The advantages of the invention is attainable also when the CWM supply ports 603b are formed in the small-diameter cylindrical surface of the pre-mixing chamber. The CWM supply ports 603b are preferably oriented such that the CWM jetted therefrom is directed tangentially to the large-diameter cylindrical surface of the pre-mixing chamber 612 so that the CWM jetted into the pre-mixing chamber 612 may form a swirl.

In this embodiment, the atomizing medium supply ports 610b are opened towards the downstream side of the pre-mixing chamber 612. This, however, is not exclusive and the arrangement may be such that the atomizing medium supply ports 610b are opened in such a manner as to form a swirl within the pre-mixing chamber 612. In such a case, it is possible to obtain a higher degree of uniformity of the mixture of the CWM and the atomizing medium. In addition, the swirl produces an appreciable effect on the atomization so as to promote the atomization of the CWM within the pre-mixing chamber.

The mixing chamber 615 has a cylindrical cup-like form. In this embodiment, the mean length of the mixing chamber 615, which is determined by dividing the volume of the space by the diameter, is selected to be 0.5 of the diameter of the chamber. The spray ports formed in the wall of the mixing chamber are directed such that the mixture jetted therefrom diverge. Preferably, the wall of the mixing chamber is made from a material obtained by sintering one of the aforementioned ceramics materials. It is also preferred that the outer peripheral surface of the sintered member is covered by a metallic member such as a steel sheet for the purpose of protection.

Figure 22:
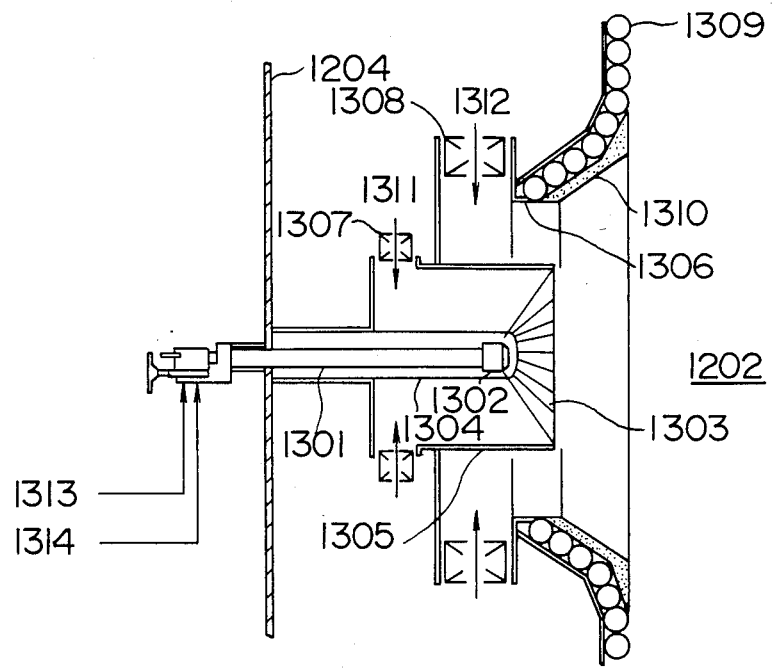
FIGS. 22 and 23 are sectional views of burners suitable for use in boilers of the present invention.

FIG. 22 shows the construction of another burner 1203 which incorporates the atomizer 1206. The burner 1203 has the following constituents: a burner gun 1301 for supplying CWM and steam, the atomizer 1206; an atomizer sleeve 1304, a primary sleeve 1305, and a throat 1306 which are arranged around the atomizer 1302 coaxially therewith and having diameters which increase in the mentioned order; a swirler 1303 arranged in a funnel-like form between the end of the atomizer sleeve 1304 and the end of the primary sleeve 1305; a primary air register disposed on the opposite side of the primary sleeve 1305 to the furnace; a secondary air register 1308 arranged on the opposite side of the throat to the furnace; a flame holding caster 1310 connected to the opening of the throat adjacent to the furnace and having a diameter which progressively increases towards the furnace; and a plurality of water tubes 1309 constituting a water tube wall.

The burner gun 1301 and the atomizer 1302 are received in a bore in the atomizer sleeve 1304. The atomizer sleeve 1304 and the primary sleeve 1305 define therebetween an annular passage through which the primary air 1311 passes after a flow-rate control effected by the primary air register. The swirler 1303 is disposed at the outlet of the annular passage. The swirler 1303 is constituted by a plurality of sector-shaped thin plates which are arranged in the circumferential direction so as to partially overlap in the axial direction leaving a predetermined gap between adjacent plates. The outer peripheral end of the swirler 1303 is disposed closer to the furnace than the end of the atomizer is. The primary air 1311 is jetted through the gaps formed between the plates such as to flow in contact with the plate surfaces, so that the primary air 1311 discharged from the swirler 1303 forms a swirl. The secondary air 1312 is made to swirl by the secondary air register 1308 so that it is jetted from the annular passage formed between the throat 1306 and the primary sleeve 1305. The flame holding caster 1310 is heated by the heat radiated from the flame which is formed by burning of the atomized CWM, and a part of the heat transmitted thereto is delivered to the water tubes of the water tube wall.

This atomizer can atomize the CWM fuel in good order. This atomizer is arranged on the burner 1203 as shown in FIG. 22. As explained before, the primary air is supplied through the gaps formed between the plates of the swirler 1303 so as to flow in contact with the plate surfaces, thereby forming a swirl. The primary air does not have velocity component of the atomized CWM particles and is supplied at a large rate, so that it can effectively decelerate the atomized CWM particles when mixed with the latter. The swirl of the primary air also serves to cause a circulation of the gas, tending to direct the hot gas of the flame towards the swirler 1303, so that the water content of the atomized particles is evaporated rapidly. The atomized particles tend to attach to the surfaces of the plates of the swirler 1303 so as to cause a change in the state of air around the burner, so as to impair the stability of the flame. In this embodiment, however, the atomized particles attaching to the plates of the swirler act to remove these particles from the surfaces of the swirler plates, so that the above-mentioned problem is eliminated to ensure a high stability of the flame.

It is to be understood also that the ignition of the CWM particles, as well as the holding of the flame, is improved by virtue of the fact that the secondary air is made to strongly swirl by the secondary air register 1308. Furthermore, a part of the secondary air is mixed with the fuel in a downstream portion of the flame, so that a reducing atmosphere for reducing the NOx is formed in the region around the burner, thus effectively diminishing the NOx content in the gas flowing out of the furnace.

The flame holding caster 1310 is heated by the heat radiated from the flame, as well as the heat conducted thereto. The flame holding caster 1310 in turn heats the secondary air by transferring heat to the secondary air and also heats the atomized CWM particles through radiation. In consequence, the evaporation of the water content in CWM particles is promoted to ensure a quick ignition of the atomized CWM particles.

The combustion system described can attain an improvement in the ignitability and the flame-holding performance, as well as a decrease in the NOx content, by virtue of the multiplication of effects produced by the atomizer and the burner having the described constructions.

Figure 23:
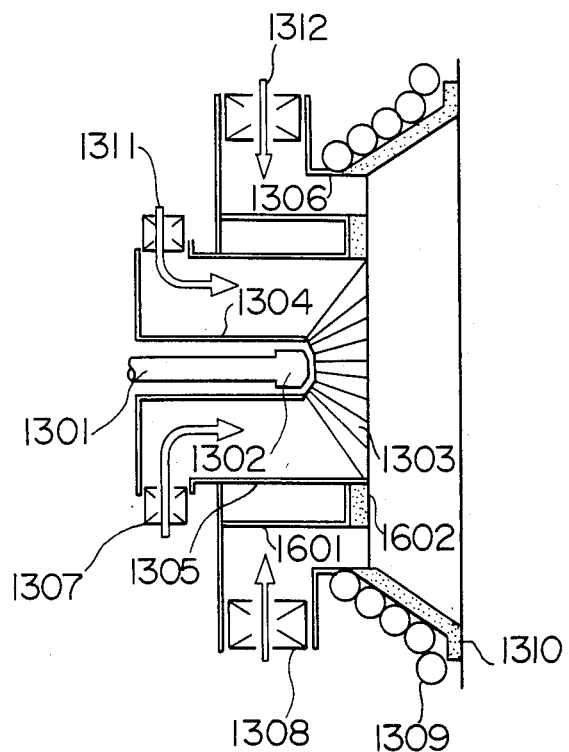

FIG. 23 shows another burner which incorporates an atomizer of the invention. More specifically, this burner employs the atomizer explained in connection with FIG. 12 and is used in a CWM fired boiler shown in FIG. 18.

The burner 1203 has the following constituents: a burner gun 1301 for supplying CWM and steam, the atomizer 1302; an atomizer sleeve 1304, a primary sleeve 1305, and a throat 1306 which are arranged around the atomizer 1302 coaxially therewith and having diameters which increase in the mentioned order; a swirler 1303 arranged in an annular space defined by the atomizer sleeve 1304 and the primary sleeve 1305; a primary air register disposed on the opposite side of the primary sleeve 1305 to the furnace; a flame holding caster 1602 disposed so as to close the opening of an annular space between the primary sleeve 1305 and the secondary sleeve 1601 adjacent to the furnace; a secondary air register 1308 arranged on the opposite side of the throat to the furnace; a flame holding caster 1310 connected to the opening of the throat adjacent to the furnace and having a diameter which progressively increases towards the furnace; and a plurality of water tubes constituting a water tube wall.

The burner gun 1301 and the atomizer 1302 are received in a bore in the atomizer sleeve 1304. The atomizer sleeve 1304 and the primary sleeve 1305 define therebetween an annular passage through which the primary air 1311 passes after a flow-rate control effected by the primary air register. The swirler 1303 is disposed on the outlet of the annular passage. The swirler 1303 is constituted by a plurality of sector-shaped thin plates which are arranged in the circumferential direction so as to partially overlap in the axial direction leaving a predetermined gap between adjacent plates. The outer peripheral end of the swirler 1303 is disposed closer to the furnace than the end of the atomizer is. The primary air 1311 is jetted through the gaps formed between the plates such as to flow in contact with the plate surfaces, so that the primary air 1311 discharged from the swirler 1303 forms a swirl. The secondary air 1312 is made to swirl by the secondary air register 1308 and is jetted from the annular passage formed between the throat 1306 and the primary sleeve 1305. The flame holding caster 1310 is heated by the heat radiated from the flame which is formed by burning of the atomized CWM, and a part of the heat transmitted thereto is delivered to the water tubes of the water tube wall. The flame holding caster 1602 is heated by the radiation from the flame of the burnt CWM particles so as to heat the atomized unburnt CWM particles while delaying the mixing of the secondary air into the flame.

The CWM particles atomized in the atomizer 1302 is decelerated by the primary air which is supplied through the swirler 1303 and the recirculating flow of hot gas formed by the primary air promotes the evaporation of water content in the atomized CWM particles, thus enabling the atomized particles to be ignited quickly.

Thus, the ignition is promoted by the multiplied effect produced by the promotion of atomization in the atomizer 1302 and the supply of the primary air through the swirler 1303. This in turn eliminated the necessity for the promotion of the ignition by the secondary air, and makes it possible to supply the secondary air solely for the purpose of decreasing the production of NOx. Thus, in this embodiment, the mixing of the secondary air and the atomized CWM particles is delayed by the flame holding caster 1602 provided on the outer periphery of the swirler 1303, so that a combustion region with insufficient oxygen is formed on the flame-side of the swirler 1303. Reducing gases such as $NH_3$, CO and $H_2$ effective for reducing the NOx are formed in this region, so that NOx produced in the early stage of the combustion of the fuel is effectively reduced into $N_2$ within this region of insufficient oxygen. At the same time, a recirculating flow of gas is formed on the flame-side of the flame holding caster 602, thus improving the holding of the sprayed flame on the burner.

The secondary air is made to strongly swirl by the secondary air register 1308, so that a recirculating flow of gas returning from the downstream portion of the flame to the swirler 1303 is formed in the above-mentioned combustion region with insufficient oxygen, thus promoting the reduction of NOx. In addition, since the secondary air is mixed into the fuel particles on the downstream side of the combustion region with insufficient oxygen, the combustion of the atomized particles is promoted and the content of unburnt components in the ash is decreased.

The flame caster 1310 is heated by the heat radiated from the flame, and effectively heats the secondary air by a heat transfer thereto. The flame holding caster 1301 also heats the atomized CWM particles through radiation. In consequence, the evaporation of the CWM particles is promoted to enable the CWM particles to be ignited rapidly.

In the embodiment shown in FIG. 23, the flame holding caster 1602 has a flat annular surface facing the furnace. This form of the flame holding caster 1602, however, is only illustrative and the flame-holding caster 1602 can have various forms so as to cope with the demand for the delay of mixing of the secondary air and the demand for the holding of the flame.

Figure 24:
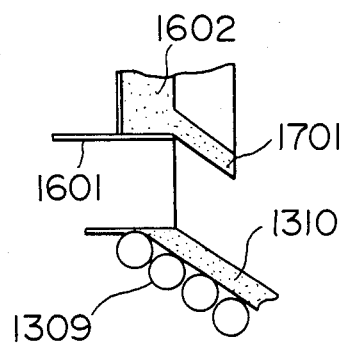
FIG. 24 is a sectional view showing the detail of a flame holding caster in a burner used in the boiler of the present invention.

FIG. 24 shows a modification of the flame-holding caster 1602. In this embodiment, the flame-holding caster 1602 has a flame-holding ring 1701 disposed at a position where the flame holding caster contacts the secondary sleeve 1601. The flame-holding ring 1701 has a form the diameter of which progressively increases towards the furnace. The flame-holding ring 1701 effectively delays the mixing of the secondary air into the atomized CWM particles, and serves to grow the recirculating flow of the gas formed on the flame-side of the flame-holding caster 1602, so that the flame-holding caster 1602 can have a further improved performance for holding the flame of the burnt CWM particles.

Although the invention has been described with specific reference to atomizers, boilers and burners designed for burning CWM as the fuel, it is to be understood that the invention can be effectively applied to combustion systems adapted for burning a fuel which containing a fuel component in the form of solid particles, such as a coal-oil slurry consisting of coal particles suspended in petroleum, a petroleum pitch slurry containing particles of petroleum pitch suspended in water, as well as a fuel which is generally difficult to burn, e.g., a sludge oil.

What is claimed is:

1. An atomizer including a fuel supply passage for supplying a fuel, an atomizing medium supply passage for supplying an atomizing medium which is to be mixed with said fuel, a mixing chamber in communication with said fuel supply passage and said atomizing medium supply passage, and spray ports for spraying the fluid mixture consisting of said fuel and said atomizing medium from said mixing chamber, said atomizer comprising:

a pre-mixing chamber having an annular cross-section defined by a large-diameter cylindrical surface and a small-diameter cylindrical surface, said fuel supply passage and said atomizing medium supply passage being in communication with said mixing chamber through said pre-mixing chamber, such that said fuel and said atomizing medium supplied from said fuel supply passage and said atomizing medium supply passage are pre-mixed in said pre-mixing chamber; and said fuel supply passage having means for spraying said fuel into said pre-mixing chamber in a film-shaped flow of an annular cross-section corresponding to said pre-mixing chamber annular cross section and in a downstream direction, and said atomizing medium supply passage having means for spraying said atomizing medium into said pre-mixing chamber downstream of said fuel spraying means in a direction crossing said downstream direction of said film-shaped flow of said fuel.

2. An atomizer including a fuel supply passage for supplying a fuel, an atomizing medium supply passage for supplying an atomizing medium which is to be mixed with said fuel, a mixing chamber in communication with said fuel supply passage and said atomizing medium supply passage, and a sprayer plate constituting an outer wall of said mixing chamber and having spray ports for spraying from said mixing chamber the fluid mixture consisting of said fuel and said atomizing medium, one of said fuel supply passage and said mixing medium supply passage constituting a mixing-object fluid supply passage while the other constitutes an admixture fluid supply passage, said atomizer comprising:

a pre-mixing chamber having an annular cross-section defined by a large-diameter cylindrical surface and a small-diameter cylindrical surface, said mixing-object fluid supply passage being connected to said mixing chamber through said pre-mixing chamber while said admixture fluid supply passage is connected to admixture fluid supply ports formed in at least one of said large-diameter cylindrical surface and said small-diameter cylindrical surface, said pre-mixing chamber having a length which is large enough to provide a fly distance sufficient for enabling said fuel supplied from said fuel supply passage and said atomizing medium supplied from said atomizing medium supply passage to be mixed in said pre-mixing chamber; and said fuel supply passage having means for spraying said fuel into said pre-mixing chamber in a film-shaped flow of an annular cross-section corresponding to said pre-mixing chamber annular cross section and in a downstream direction, and said atomizing medium supply passage having means for spraying said atomizing medium into said pre-mixing chamber downstream of said fuel spraying means in a direction crossing said downstream direction of said film-shaped flow of said fuel.

3. An atomizer according to claim 2, wherein said admixture fluid supply ports formed in at least one of said large-diameter cylindrical surface and said small-diameter cylindrical surface are oriented such that the flow of the admixture fluid supplied from said a mixture fluid supply ports have a component which is tangential to the cylindrical surface in which said admixture fluid supply ports are formed.

4. An atomizer according to claim 2, wherein said admixture fluid supply ports are formed by a ring-shaped groove formed in said at least one of the large-diameter cylindrical surface and said small-diameter cylindrical surface.

5. An atomizer according to claim 2, wherein said admixture fluid supply ports are formed in a direction perpendicular to said cylindrical surface in which said admixture fluid supply ports are formed.

6. An atomizer according to claim 2, wherein said admixture fluid supply ports are formed in one of said large-diameter cylindrical surface and said small-diameter cylindrical surface and are directed to aim at the downstream end of the other of said cylindrical surfaces.

7. An atomizer according to claim 6, wherein said pre-mixing chamber has an annular cross-section the diameter of which is increased towards the downstream end thereof.

8. An atomizer according to claim 2, further comprising a spacer member disposed between said large-diameter cylindrical surface and said small-diameter cylindrical surface defining said pre-mixing chamber so as to maintain a predetermined clearance therebetween.

9. An atomizer according to claim 2, further comprising a collision wall disposed in said mixing chamber so as to be collided by the mixture fluid consisting of said fuel and said atomizing medium coming from said pre-mixing chamber.

10. An atomizer according to claim 2, wherein said fuel is a coal-water slurry.

11. An atomizer according to claim 10, wherein said coal-water slurry has a coal content not smaller than 50 wt %.

12. An atomizer according to claim 2, wherein said mixing chamber has a mean length determined by dividing the volume of said mixing chamber by the diameter of said mixing chamber ranging between 0.3 and 0.7 of said diameter, and wherein said admixture fluid supply ports being arranged in plural in the radial directions.

13. An atomizer including a fuel supply passage for supplying a fuel, an atomizing medium supply passage for supplying an atomizing medium which is to be mixed with said fuel, a mixing chamber in communication with said fuel supply passage and said atomizing medium supply passage, and a sprayer plate constituting an outer wall of said mixing chamber and having spray ports for spraying from said mixing chamber the fluid mixture consisting of said fuel and said atomizing medium, one of said fuel supply passage and said mixing medium supply passage constituting a mixing-object fluid supply passage while the other constitutes an admixture fluid supply passage, said atomizer comprising:

a pre-mixing chamber having an annular cross-section defined by a large-diameter cylindrical surface and a small-diameter cylindrical surface, said mixing-object fluid supply passage being connected to said mixing chamber through said pre-mixing chamber while said admixture fluid supply passage is connected to admixture fluid supply ports formed in at least one of said large-diameter cylindrical surface and said small-diameter cylindrical surface, said pre-mixing chamber having a length which is large enough to provide a fly distance sufficient for enabling said fuel supplied from said fuel supply passage and said atomizing medium supplied from said atomizing medium supply passage to be mixed in said pre-mixing chamber; and another atomizing medium supply passage communicated with a swirler provided in said sprayer plate, said swirler being arranged such that the atomizing medium jetted therefrom is mixed with the mixture flow of said fuel and said atomizing medium sprayed from said mixing chamber through said spray ports.

14. An atomizer including a fuel supply passage for supplying a fuel, an atomizing medium supply passage for supplying an atomizing medium which is to be mixed with said fuel, a mixing chamber in communication with said fuel supply passage and said atomizing medium supply passage, and spray ports for spraying the fluid mixture consisting of said fuel and said atomizing medium, said atomizer comprising:

a pre-mixing chamber having an annular cross-section defined by a large-diameter cylindrical surface and a small-diameter cylindrical surface, said fuel supply passage being in communication with said mixing chamber through said pre-mixing chamber, said fuel supply passage having port means for spraying said fuel into said pre-mixing chamber in a film-shaped flow of an annular cross-section corresponding to said pre-mixing chamber annular cross-section and in a downstream direction, said atomizing medium supply passage being connected to atomizing medium supply port means formed in said large-diameter cylindrical surface for spraying said atomizing medium into said pre-mixing chamber downstream of said fuel spraying means, said atomizing medium supply port means being so oriented that the flow of said atomizing medium jetted therefrom has components parallel with and perpendicular to the direction of flow of said film-shaped flow of said fuel in said pre-mixing chamber, said pre-mixing chamber having a length which is large enough to provide a fly distance sufficient for enabling said fuel supplied from said fuel supply passage and said atomizing medium supplied from said atomizing medium supply passage to be mixed in said pre-mixing chamber.

15. An atomizer according to claim 14, wherein said atomizing medium supply ports are so oriented that the flow of said atomizing medium jetted therefrom has a component tangential to said large-diameter cylindrical surface and are aimed at the downstream end of said small-diameter cylindrical surface.

16. An atomizer according to claim 15, wherein said pre-mixing chamber has an annular cross-section the diameter of which is increased towards the downstream end thereof.

17. An atomizer according to claim 14, further comprising a collision wall disposed in said mixing chamber so as to be collided by the mixture fluid consisting of said fuel and said atomizing medium coming from said pre-mixing chamber.

18. An atomizer according to claim 14, wherein said fuel is a coal-water slurry.

19. A coal-water slurry fired boiler having atomizers for atomizing a coal-water slurry by an atomizing medium, a plurality of burners provided on a wall of a furnace and adapted for mixing the atomized coal-water slurry from said atomizers with a swirl of air so as to burn said coal-water slurry, and steam heating tubes installed in said furnace so as to be heated by the gas generated by burning, wherein said atomizer comprises:

a mixing chamber for mixing said coal-water slurry with said atomizing medium and for spraying the mixture through a plurality of spray ports; and a pre-mixing chamber having an annular cross-section and adapted for pre-mixing said coal-water slurry and said atomizing medium before they are mixed in said mixing chamber; and said pre-mixing chamber being provided with coal-water slurry passage means for spraying said coal-water slurry into said pre-mixing chamber in a film-shaped flow of an annular cross-section and in a downstream direction of movement, and atomizing medium supply passage means for supplying said atomizing medium in said pre-mixing chamber downstream of said coal-water slurry supply passage means in a direction crossing said direction of movement of said sprayed coal-water slurry having said film-shaped flow of an annular cross-section.

20. A coal-water slurry fired boiler having atomizers for atomizing a coal-water slurry by an atomizing medium, a plurality of burners provided on a wall of a furnace and adapted for mixing the atomized coal-water slurry from said atomizers with a swirl of air so as to burn said coal-water slurry, and steam heating tubes installed in said furnace so as to be heated by the gas generated by burning, wherein said atomizer comprises:

a mixing chamber for mixing said coal-water slurry with said atomizing medium and for spraying the mixture through a plurality of spray ports; and a pre-mixing chamber disposed upstream of said mixing chamber, said pre-mixing chamber having an elongated cross-section perpendicular to the axis of said atomizer, the longer axis of said elongated cross-section having a length which is large enough to provide a fly distance in the direction of flow of said coal-water slurry sufficient for ensuring mixing of said coal-water slurry and said atomizing medium; and said pre-mixing chamber being provided with coal-water slurry passage means for spraying said coal-water slurry into said pre-mixing chamber in a film-shaped flow of an annular cross-section and in a downstream direction of movement, and atomizing medium supply passage means for supplying said atomizing medium in said pre-mixing chamber downstream of said coal-water slurry supply passage means in a direction crossing said direction of movement of said sprayed coal-water slurry having said film-shaped flow of an annular cross-section.

21. A coal-water slurry fired boiler having atomizers for atomizing a coal-water slurry by an atomizing medium, a plurality of burners provided on a wall of a furnace having a final stage and adapted for mixing the atomized coal-water slurry from said atomizers with a swirl of air so as to burn said coal-water slurry, a nose disposed in said furnace at the end of the flame of said burner so as to restrict the flow of the gas generated by the burning, and steam heating tubes installed in said furnace so as to be heated by said gas, wherein said atomizer comprises:

a mixing chamber for mixing said coal-water slurry with said atomizing medium and for spraying the mixture through a plurality of spray ports; and a pre-mixing chamber disposed upstream of said mixing chamber having an annular cross-section determined such that the mean particle size of said coal-water slurry sprayed from said spray ports is not greater than 65 μm, and wherein the distance between the final stage of said burners and said nose is not longer than 2.5 m per 100 MW of the rated output of said boiler.

22. A coal-water slurry fired boiler having atomizers for atomizing a coal-water slurry by an atomizing medium, a plurality of burners provided on a wall of a furnace and adapted for mixing the atomized coal-water slurry from said atomizers with a swirl of air so as to burn said coal-water slurry, and steam heating tubes installed in said furnace so as to be heated by the gas generated by burning, wherein said atomizer comprises: a fuel supply passage for supplying a fuel, an atomizing medium supply passage for supplying an atomizing medium which is to be mixed with said fuel, a mixing chamber in communication with said fuel supply passage and said atomizing medium supply passage, spray ports for spraying the fluid mixture consisting of said fuel and said atomizing medium, and a pre-mixing chamber having an annular cross-section, said fuel supply passage and said atomizing medium supply passage being communicated with said mixing chamber through said pre-mixing chamber, said fuel and said atomizing medium supplied from said fuel supply passage and said atomizing medium supply passage are pre-mixed in said pre-mixing chamber; and said pre-mixing chamber being provided with coal-water slurry passage means for spraying said coal-water slurry into said pre-mixing chamber in a film-shaped flow of an annular cross-section and in a downstream direction of movement, and atomizing medium supply passage means for supplying said atomizing medium in said pre-mixing chamber downstream of said coal-water slurry supply passage means in a direction crossing said direction of movement of said sprayed coal-water slurry having said film-shaped flow of an annular cross-section.

23. A coal-water slurry fired boiler according to claim 22, wherein said fuel supply passage or said atomizing medium supply passage has supply ports which are disposed in the upstream end of said pre-mixing chamber and are so oriented that the flow of said fuel or said atomizing medium jetted into said pre-mixing chamber has a component tangential to the cylindrical surface of said pre-mixing chamber so as to form a swirl.

24. A coal-water slurry fired boiler having atomizers for atomizing a coal-water slurry by an atomizing medium, a plurality of burners provided on a wall of a furnace and adapted for mixing the atomized coal-water slurry from said atomizers with a swirl of air so as to burn said coal-water slurry, and steam heating tubes installed in said furnace so as to be heated by the gas generated by burning, said atomizer including a mixing chamber for mixing said coal-water slurry with said atomizing medium and for spraying the mixture through a plurality of spray ports, and a pre-mixing chamber having an annular cross-section and adapted for pre-mixing said coal-water slurry and said atomizing medium before they are mixed in said mixing chamber, each said burner comprising:

a primary pre-combustion chamber coaxial with said atomizer and conically diverging from the end of said atomizer;

a secondary pre-combustion chamber disposed ahead of said primary pre-combustion chamber;

an annular primary air nozzle disposed on the outer periphery of said primary pre-combustion chamber and adapted for introducing into said secondary pre-combustion chamber a primary air in the form of a swirl around the axis of said atomizer;

a secondary air nozzle disposed on the outer periphery of said secondary pre-combustion chamber and adapted for introducing into said furnace a secondary air in the form of a swirl around the axis of said atomizer; and said pre-mixing chamber being provided with coal-water slurry passage means for spraying said coal-water slurry into said pre-mixing chamber in a film-shaped flow of an annular cross-section and in a downstream direction of movement, and atomizing medium supply passage means for supplying said atomizing medium in said pre-mixing chamber downstream of said coal-water slurry supply passage means in a direction crossing said direction of movement of said sprayed coal-water slurry having said film-shaped flow of an annular cross-section.

25. A coal-water slurry fired boiler having atomizers for atomizing a coal-water slurry by an atomizing medium, a plurality of burners provided on a wall of a furnace and adapted for mixing the atomized coal-water slurry from said atomizers with a swirl of air so as to burn said coal-water slurry, and steam heating tubes installed in said furnace so as to be heated by the gas generated by burning, said atomizer including a fuel supply passage for supplying a fuel, an atomizing medium supply passage for supplying an atomizing medium which is to be mixed with said fuel, a mixing chamber in communication with said fuel supply passage and said atomizing medium supply passage, spray ports for spraying the fluid mixture consisting of said fuel and said atomizing medium from said mixing chamber, and a pre-mixing chamber having an annular cross-section, said fuel supply passage and said atomizing medium supply passage being communicated with said mixing chamber through said pre-mixing chamber, each said burner comprising:

a primary pre-combustion chamber coaxial with said atomizer and conically diverging from the end of said atomizer;

a secondary pre-combustion chamber disposed ahead of said primary pre-combustion chamber;

an annular primary air nozzle disposed on the outer periphery of said primary pre-combustion chamber and adapted for introducing into said secondary pre-combustion chamber a primary air in the form of a swirl around the axis of said atomizer;

a secondary air nozzle disposed on the outer periphery of said secondary pre-combustion chamber and adapted for introducing into said furnace a secondary air in the form of a swirl around the axis of said atomizer; and said pre-mixing chamber being provided with coal-water slurry passage means for spraying said coal-water slurry into said pre-mixing chamber in a film-shaped flow of an annular cross-section and in a downstream direction of movement, and atomizing medium supply passage means for supplying said atomizing medium in said pre-mixing chamber downstream of said coal-water slurry supply passage means in a direction crossing said direction of movement of said sprayed coal-water slurry having said film-shaped flow of an annular cross-section.

26. A coal-water slurry fired boiler having atomizers for atomizing a coal-water slurry by an atomizing medium, a plurality of burners provided on a wall of a furnace and adapted for mixing the atomized coal-water slurry from said atomizers with a swirl of air so as to burn said coal-water slurry, and steam heating tubes installed in said furnace so as to be heated by the gas generated by burning, said atomizer including a mixing chamber for mixing said coal-water slurry with said atomizing medium and for spraying the mixture through a plurality of spray ports, and a pre-mixing chamber disposed upstream of said mixing chamber, said pre-mixing chamber having an elongated cross-section perpendicular to the axis of said atomizer, the longer axis of said elongated cross-section having a length which is large enough to provide a fly distance in the direction of flow of said coal-water slurry sufficient for ensuring mixing of said coal-water slurry and said atomizing medium, each said burner comprising:
- a primary pre-combustion chamber coaxial with said atomizer and conically diverging from the end of said atomizer;
- a secondary pre-combustion chamber disposed ahead of said primary pre-combustion chamber;
- an annular primary air nozzle disposed on the outer periphery of said primary pre-combustion chamber and adapted for introducing into said secondary pre-combustion chamber a primary air in the form of a swirl around the axis of said atomizer;
- a secondary air nozzle disposed on the outer periphery of said secondary pre-combustion chamber and adapted for introducing into said furnace a secondary air in the form of a swirl around the axis of said atomizer; and
- said pre-mixing chamber being provided with coal-water slurry passage means for spraying said coal-water slurry into said pre-mixing chamber in a film-shaped flow of an annular cross-section and in a downstream direction of movement, and atomizing medium supply passage means for supplying said atomizing medium in said pre-mixing chamber downstream of said coal-water slurry supply passage means in a direction crossing said direction of movement of said sprayed coal-water slurry having said film-shaped flow of an annular cross-section.

27. An atomizer according to claim 3, wherein said admixture fluid supply ports are formed by a ring-shaped groove formed in said at least one of the large-diameter cylindrical surface and said small-diameter cylindrical surface.

28. An atomizer according to claim 4, wherein said admixture fluid supply ports are formed in a direction perpendicular to said cylindrical surface in which said admixture fluid supply ports are formed.

29. An atomizer according to claim 5, wherein said admixture fluid supply ports are formed in one of said large-diameter cylindrical surface and said small-diameter cylindrical surface and are directed to aim at the downstream end of the other of said cylindrical surfaces.

30. An atomizer according to claim 3, further comprising a spacer member disposed between said large-diameter cylindrical surface and said small-diameter cylindrical surface defining said pre-mixing chamber so as to maintain a predetermined clearance therebetween.

31. An atomizer according to claim 4, further comprising a spacer member disposed between said large-diameter cylindrical surface and said small-diameter cylindrical surface defining said pre-mixing chamber so as to maintain a predetermined clearance therebetween.

32. An atomizer according to claim 5, further comprising a spacer member disposed between said large-diameter cylindrical surface and said small-diameter cylindrical surface defining said pre-mixing chamber so as to maintain a predetermined clearance therebetween.

33. An atomizer according to claim 6, further comprising a spacer member disposed between said large-diameter cylindrical surface and said small-diameter cylindrical surface defining said pre-mixing chamber so as to maintain a predetermined clearance therebetween.

34. An atomizer according to claim 7, further comprising a spacer member disposed between said large-diameter cylindrical surface and said small-diameter cylindrical surface defining said pre-mixing chamber so as to maintain a predetermined clearance therebetween.

35. An atomizer according to claim 8, further comprising a collision wall disposed in said mixing chamber so as to be collided by the mixture fluid consisting of said fuel and said atomizing medium coming from said pre-mixing chamber.

36. An atomizer according to claim 9, wherein said fuel is a coal-water slurry.

37. An atomizer according to claim 11, wherein said mixing chamber has a mean length determined by dividing the volume of said mixing chamber by the diameter of said mixing chamber ranging between 0.3 to 0.7 of said diameter, and wherein said admixture fluid supply ports being arranged in plural in the radial directions.

38. An atomizer according to claim 16, further comprising a collision wall disposed in said mixing chamber so as to be collided by the mixture fluid consisting of said fuel and said atomizing medium coming from said pre-mixing chamber.

39. An atomizer according to claim 17, wherein said fuel is a coal-water slurry.

40. An atomizer including a fuel supply passage for supplying a fuel, an atomizing medium supply passage for supplying an atomizing medium which is to be mixed with said fuel, a mixing chamber in communication with said fuel supply passage and said atomizing medium supply passage, and a sprayer plate constituting an outer wall of said mixing chamber and having spray ports for spraying from said mixing chamber the fluid mixture consisting of said fuel and said atomizing medium, one of said fuel supply passage and said mixing medium supply passage constituting a mixing-object fluid supply passage while the other constitutes an admixture fluid supply passage, said atomizer comprising:
- a pre-mixing chamber having an annular cross-section defined by a large-diameter cylindrical surface and a small-diameter cylindrical surface, said mixing-object fluid supply passage being connected to said mixing chamber through said pre-mixing chamber while said admixture fluid supply passage is connected to admixture fluid supply ports formed in at least one of said large-diameter cylindrical surface and said small-diameter cylindrical surface, said pre-mixing chamber having a length which is large enough to provide a fly distance sufficient for enabling said fuel supplied from said fuel supply passage and said atomizing medium supplied from said atomizing medium supply passage to be mixed in said pre-mixing chamber;

another atomizing medium supply passage communicated with a swirler provided in said sprayer plate, said swirler being arranged such that the atomizing medium jetted therefrom is mixed with the mixture flow of said fuel and said atomizing medium sprayed from said mixing chamber through said spray ports; and said pre-mixing chamber being provided with coal-water slurry passage means for spraying said coal-water slurry into said pre-mixing chamber in a film-shaped flow of an annular cross-section and in a downstream direction of movement, and atomizing medium supply passage means for supplying said atomizing medium in said pre-mixing chamber downstream of said coal-water slurry supply passage means in a direction crossing said direction of movement of said sprayed coal-water slurry having said film-shaped flow of an annular cross-section.

* * * * *